United States Patent
Shukair et al.

(10) Patent No.: US 12,015,993 B2
(45) Date of Patent: Jun. 18, 2024

(54) DYNAMIC MODEM PARTITIONING TECHNIQUES FOR MULTIPLE SUBSCRIBER IDENTIFICATION MODULES

(71) Applicant: QUALCOMM Incorporated, San Diego, CA (US)

(72) Inventors: Mutaz Zuhier Afif Shukair, San Diego, CA (US); Qingxin Chen, San Diego, CA (US); Francis Ming-Meng Ngai, Louisville, CO (US); Reza Shahidi, San Diego, CA (US); Cheol Hee Park, San Diego, CA (US); Bhupesh Manoharlal Umatt, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 238 days.

(21) Appl. No.: 17/542,327

(22) Filed: Dec. 3, 2021

(65) Prior Publication Data

US 2023/0180170 A1 Jun. 8, 2023

(51) Int. Cl.
*H04W 60/00* (2009.01)
*H04W 8/18* (2009.01)
(Continued)

(52) U.S. Cl.
CPC ......... *H04W 60/005* (2013.01); *H04W 8/183* (2013.01); *H04W 76/15* (2018.02); *H04W 88/06* (2013.01)

(58) Field of Classification Search
CPC ............ H04W 50/02; H04W 72/0453; H04W 72/543; H04W 72/48; H04W 52/0261;
(Continued)

(56) References Cited

U.S. PATENT DOCUMENTS 10,368,319 B2 * 7/2019 Zhou ................. H04W 52/0261
2016/0174182 A1 * 6/2016 Lin ....................... H04W 48/16
455/435.1
(Continued)

FOREIGN PATENT DOCUMENTS

CN 114365582 * 5/2020
CN 111178101 * 4/2022
(Continued)

OTHER PUBLICATIONS

P. Xue, H. Ryu, S.-H. Park and S. Choi, "Collision-aware resource access in LTE-based device-to-device communication systems," 2015 IEEE International Conference on Communication Workshop (ICCW), London, UK, 2015, pp. 646-650, doi: 10.1109/ICCW.2015. 7247254. (Year: 2015).*

(Continued)

*Primary Examiner* — William D Cumming
(74) *Attorney, Agent, or Firm* — Holland & Hart LLP

(57) ABSTRACT

A user equipment (UE) may use multiple subscriber identification modules (SIMs) in dual-SIM dual-active (DSDA) communications. The A DSDA UE may support identification of a set of available radio frequency (RF) resources for communications, where the set of available RF resources include multiple RF components (e.g., transmit/receive antennas), RF baseband resources (e.g., processing resources that support processing and decoding of transmissions), or combinations thereof. The set of available resources may be shared between multiple SIMS, and the UE may identify different resource partitions of the set of available resources, with different resource partitions used to provide concurrent communications of both the first SIM and the second SIM based on parameters of each SIM.

30 Claims, 11 Drawing Sheets

(51) Int. Cl.
*H04W 76/15* (2018.01)
*H04W 88/06* (2009.01)

(58) Field of Classification Search
CPC . H04W 76/15; H04W 72/21; H04W 28/0289; H04W 48/16; H04W 72/52
USPC .............................. 455/435.1; 370/237, 329
See application file for complete search history.

(56) References Cited

U.S. PATENT DOCUMENTS

| | | | |
|---|---|---|---|
| 2016/0198360 A1* | 7/2016 | Smith ............... | H04W 28/0289 370/237 |
| 2018/0077655 A1 | 3/2018 | Zhou et al. | |
| 2020/0137556 A1 | 4/2020 | Park et al. | |
| 2021/0204111 A1 | 7/2021 | Jung et al. | |
| 2022/0240079 A1 | 7/2022 | Lovlekar et al. | |
| 2023/0117026 A1* | 4/2023 | Gopal ................. | H04W 72/543 370/329 |
| 2023/0180170 A1* | 6/2023 | Shukair ................ | H04W 72/21 370/329 |

FOREIGN PATENT DOCUMENTS

| | | | | |
|---|---|---|---|---|
| WO | WO-2021160284 A1 | | 8/2021 | |
| WO | WO-2023069221 A1 | * | 4/2023 | .......... H04W 72/048 |

OTHER PUBLICATIONS

International Search Report and Written Opinion—PCT/US2022/077098—ISA/EPO—dated Jan. 20, 2023.

* cited by examiner

DYNAMIC MODEM PARTITIONING TECHNIQUES FOR MULTIPLE SUBSCRIBER IDENTIFICATION MODULES

FIELD OF TECHNOLOGY

The following relates to wireless communications, including dynamic modem partitioning techniques for multiple subscriber identification modules.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a UE may be capable of supporting multiple subscriber identification module (SIM) cards, each associated with a unique network subscription, and the UE may communicate with multiple service providers using the multiple SIM cards.

SUMMARY

The described techniques relate to improved methods, systems, devices, and apparatuses that support dynamic modem partitioning techniques for multiple subscriber identification modules (SIMs). In accordance with various aspects, the described techniques provide for allocation of radio frequency (RF) resources, for communications associated with multiple SIMs using a dual-SIM dual-active (DSDA) configuration. In some cases, a UE may identify a set of available resources for communications at the UE, where the set of available resources include multiple RF components (e.g., transmit/receive antennas, transmit/receive chains, transmit power amplifiers (PAs), receive low noise amplifiers (LNAs), band select switches, other RF frond-end components, or any combinations thereof), RF baseband resources (e.g., processing resources (e.g., computational resources) and memory resources that support processing and decoding of a number of carriers in carrier aggregation (CA) and a number of multiple-input multiple-output (MIMO) layers based on a modulation and coding scheme (MCS) and throughput limit), or any combinations thereof. The set of available resources may be shared between a first SIM and a second SIM.

In some cases, the UE may identify a resource partition of the set of available resources that includes a first subset of resources and a second subset of resources, each subset of resources of the resource partition providing resources for at least partially concurrent communications of both the first SIM and the second SIM. In some cases, the UE may determine the resource partition based at least in part on a type of service associated with each SIM, one or more communications parameters associated with each SIM, or any combinations thereof. Based on the resource partition, the UE may transmit a first indication of supported communication parameters of the first SIM to a first wireless node (e.g., a first base station or first access point) and a second indication of supported communication parameters of the second SIM to a second wireless node (e.g., a second base station or second access point). Each of the wireless nodes may allocate wireless resources to the UE based on the indications of supported communication parameters. In some cases, the UE may adjust the resource partition based on updated conditions at the UE (e.g., a data buffer associated with each SIM), and transmit supported communication parameters to each wireless node in accordance with the adjusted resource partition. The supported communication parameters that are indicated for each partition may include, for example, a number of component carriers (CCs) that are supported, a number of supported MIMO layers, a supported MCS index and modulation scheme, a supported throughput limit, a channel quality indicator (CQI) that is adjusted based on the associated resource partition, rank indicator (RI) that is adjusted based on the associated resource partition, UE assistance information (UAI), or any combinations thereof.

A method for wireless communication is described. The method may include identifying a set of available resources for communications at a user equipment (UE) that include one or more baseband resources, one or more radio frequency components, or any combinations thereof, where the set of available resources are shared between a first subscriber identification module (SIM) and a second subscriber identity module (SIM), determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof, and transmitting a first indication of supported communication parameters of the first SIM to a first wireless node and a second indication of supported communication parameters of the second SIM to a second wireless node, where the first indication is based on the first subset of resources and the second indication is based on the second subset of resources.

An apparatus for wireless communication is described. The apparatus may include a processor, memory coupled with the processor, and instructions stored in the memory. The instructions may be executable by the processor to cause the apparatus to identify a set of available resources for communications at a UE that include one or more baseband resources, one or more radio frequency components, or any combinations thereof, where the set of available resources are shared between a first subscriber identification module (SIM) and a second SIM, determine a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof, and transmit a first indication of supported communication parameters of the first SIM to a first wireless node and a second indication of supported communication parameters of the second SIM to a second wireless node, where the first indication is based on the first subset of resources and the second indication is based on the second subset of resources.

Another apparatus for wireless communication is described. The apparatus may include means for identifying a set of available resources for communications at a UE that include one or more baseband resources, one or more radio frequency components, or any combinations thereof, where the set of available resources are shared between a first subscriber identification module (SIM) and a second SIM, means for determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof, and means for transmitting a first indication of supported communication parameters of the first SIM to a first wireless node and a second indication of supported communication parameters of the second SIM to a second wireless node, where the first indication is based on the first subset of resources and the second indication is based on the second subset of resources.

A non-transitory computer-readable medium storing code for wireless communication is described. The code may include instructions executable by a processor to identify a set of available resources for communications at a UE that include one or more baseband resources, one or more radio frequency components, or any combinations thereof, where the set of available resources are shared between a first subscriber identification module (SIM) and a second SIM, determine a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof, and transmit a first indication of supported communication parameters of the first SIM to a first wireless node and a second indication of supported communication parameters of the second SIM to a second wireless node, where the first indication is based on the first subset of resources and the second indication is based on the second subset of resources.

Some examples of the method, apparatuses, and non-transitory computer-readable medium described herein may further include operations, features, means, or instructions for communicating with the first wireless node using the first SIM and with the second wireless node using the second SIM in accordance with the first resource partition, determining, subsequent to the communicating, a second resource partition of the set of available resources that includes a third subset of resources for a third communication using the first SIM and fourth subset of resources for a fourth communication using the second SIM, the second resource partition based on one or more updates to the type of service associated with each SIM, the one or more communications parameters associated with each SIM, or any combinations thereof, and transmitting a third indication of supported communication parameters of the first SIM to the first wireless node and a fourth indication of supported communication parameters of the second SIM to the second wireless node, where the third indication may be based on the third subset of resources and the fourth indication may be based on the fourth subset of resources.

In some examples of the method, apparatuses, and non-transitory computer-readable medium described herein, the determining may include operations, features, means, or instructions for determining the first resource partition based on portions of the set of available resources that are compatible with communications of the first SIM and the second SIM, one or more power limits associated with the first SIM and the second SIM, one or more frequency bands used for communications of the first SIM and the second SIM, or any combinations thereof. In some examples of the method, apparatuses, and non-transitory computer-readable medium described herein, the determining may include operations, features, means, or instructions for determining the first resource partition based on a service priority of a highest priority service of each of the first SIM and the second SIM, an amount of data to be transferred for each of the first SIM and the second SIM, channel conditions associated with each of the first SIM and the second SIM, or any combinations thereof.

In some examples of the method, apparatuses, and non-transitory computer-readable medium described herein, the first indication may be transmitted in a first measurement report to the first wireless node and the second indication may be transmitted in a second measurement report to the second wireless node, and where each of the first measurement report and the second measurement report provide one or more parameter measurements that generate wireless resource grants for each SIM that are in accordance with the first resource partition. In some examples of the method, apparatuses, and non-transitory computer-readable medium described herein, the first wireless node may be a first serving cell of a first wireless communications system or a first access point of a first wireless local area network, and the second wireless node may be a second serving cell of a second wireless communications system or a second access point of a second wireless local area network. In some examples of the method, apparatuses, and non-transitory computer-readable medium described herein, the determining is performed at a SIM arbitration function of the UE based on a requested data rate associated with each SIM and the set of available resources.

In some examples of the method, apparatuses, and non-transitory computer-readable medium described herein, the first resource partition may be further determined based on a location of one or more transmit antennas in the set of available resources, a number of receive antennas in the set of available resources, a number of transmit antennas in the set of available resources, a set of band combinations associated with each of the first SIM and the second SIM, or any combinations thereof. In some examples of the method, apparatuses, and non-transitory computer-readable medium described herein, the one or more baseband resources include one or more of a number of uplink component carriers that are supported by the UE for uplink carrier aggregation across both the first SIM and the second SIM, a number of downlink component carriers that are supported by the UE for downlink carrier aggregation across both the first SIM and the second SIM, a number of multiple-input multiple-output (MIMO) layers supported by the UE across both the first SIM and the second SIM, a maximum modulation order and coding rate supported by the UE across both the first SIM and the second SIM, a maximum throughput limit supported by the UE across both the first SIM and the second SIM, or any combinations thereof.

In some examples of the method, apparatuses, and non-transitory computer-readable medium described herein, the first resource partition may be further determined based on one or more of a combined power limit for communications across both the first SIM and the second SIM for a time period, a specific absorption rate (SAR) limit for communications of one or both the first SIM or the second SIM for the time period, a maximum permissible exposure (MPE) limit for communications for one or both the first SIM or the second SIM for the time period, or any combinations thereof. In some examples of the method, apparatuses, and non-transitory computer-readable medium described herein, the first resource partition may be further determined based on a first set of frequency bands associated with communications of the first SIM, a second set of frequency bands associated with communications of the second SIM, a frequency range of one or more of the first set of frequency bands or the second set of frequency bands, or any combinations thereof.

In some examples of the method, apparatuses, and non-transitory computer-readable medium described herein, the first resource partition may be further determined based on one or more types of service associated with communications of the first SIM and the second SIM, where the one or more types of service include data services or voice services, and where data services may be associated with different resources than voice services. In some examples of the method, apparatuses, and non-transitory computer-readable medium described herein, the first resource partition may be further determined based on an amount of data to be in an uplink buffer of each of the SIM and the second SIM, a target data throughput associated with each of the first SIM and the second SIM, a priority associated with the one or more types of service associated with communications of the first SIM and the second SIM, or any combinations thereof. In some examples of the method, apparatuses, and non-transitory computer-readable medium described herein, the first resource partition may be further determined based on one or more channel conditions associated with each of the first SIM and the second SIM, a network capability associated with each of the first SIM and the second SIM, or any combinations thereof.

Some examples of the method, apparatuses, and non-transitory computer-readable medium described herein may further include operations, features, means, or instructions for determining, for the first SIM based on the first resource partition, the first indication that provides one or more of a first number of supported component carriers (CCs), a first number of supported multiple-input multiple-output (MIMO) layers, a first modulation and coding scheme (MCS) limit, a first throughput limit, or any combinations thereof and determining, for the second SIM based on the first resource partition, the second indication that provides one or more of a second number of supported CCs, a second number of supported MIMO layers, a second MCS limit, a second throughput limit, or any combinations thereof. In some examples of the method, apparatuses, and non-transitory computer-readable medium described herein, the first indication includes one or more of a channel quality indicator (CQI) or a rank indicator (RI) for the first SIM, and where a reported channel quality information (CQI) value or RI value may be adjusted based on the first resource partition.

In some examples of the method, apparatuses, and non-transitory computer-readable medium described herein, the transmitting may include operations, features, means, or instructions for transmitting UE assisted information (UAI) to one or more of the first wireless node or the second wireless node to adapt communications parameters in accordance with the first resource partition. In some examples of the method, apparatuses, and non-transitory computer-readable medium described herein, one or more connected mode or idle mode measurements of the first SIM may be increased or decreased to adapt communications parameters of the first SIM in accordance with the first resource partition, and where corresponding measurements of the second SIM are adjusted in accordance with the measurements of the first SIM to achieve the first resource partition. Some examples of the method, apparatuses, and non-transitory computer-readable medium described herein may further include operations, features, means, or instructions for selecting, for communications associated with the first SIM, a different serving wireless node based on the first resource partition and transmitting a request to the first wireless node to switch communications associated with the first SIM from the first wireless node to the different serving wireless node.

DETAILED DESCRIPTION

Figure 1:
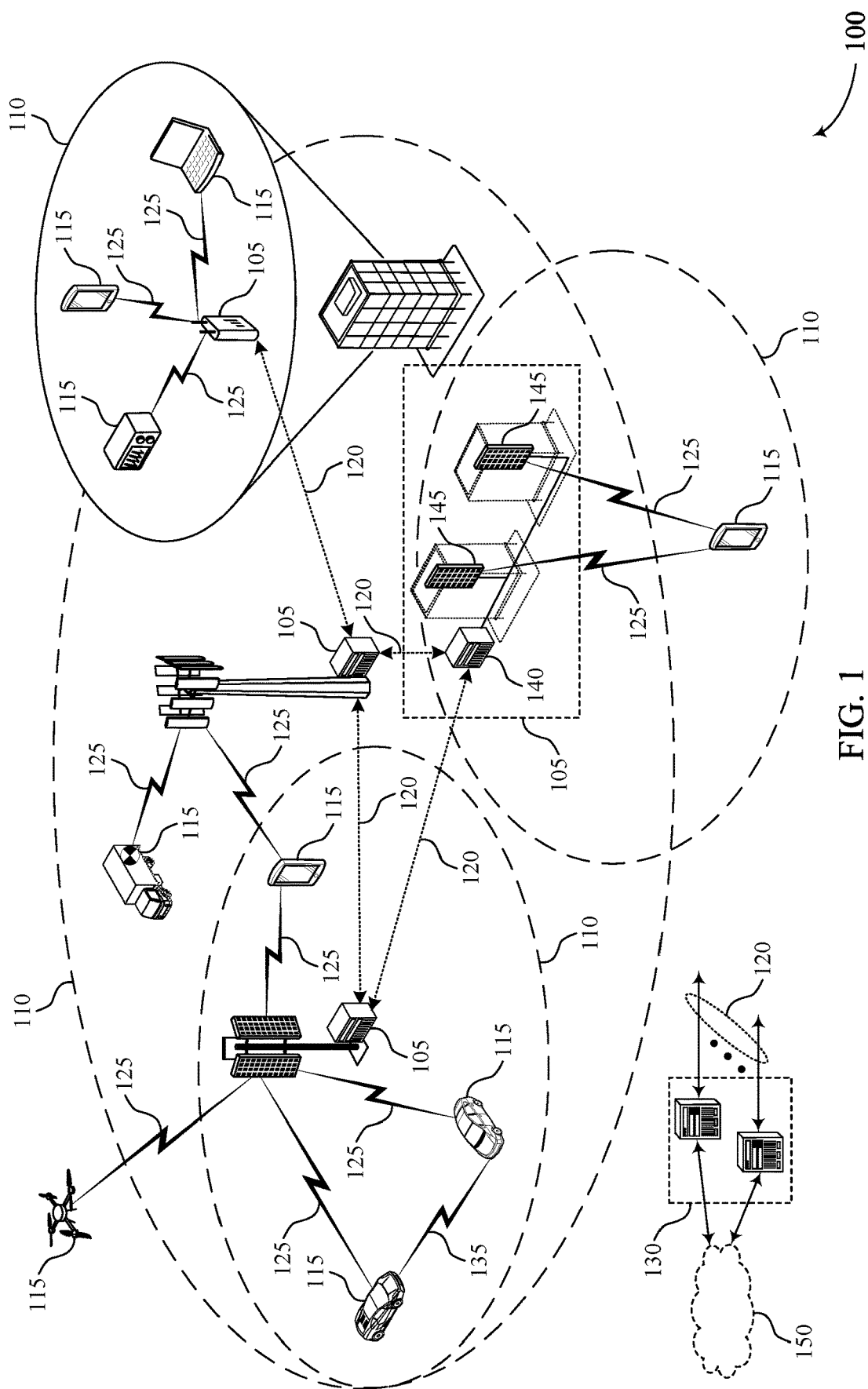
FIG. 1 illustrates an example of a wireless communications system that supports dynamic modem partitioning techniques for multiple subscriber identification modules (SIMs) in accordance with aspects of the present disclosure.

In some wireless communications systems, a user equipment (UE) may include two or more subscriber identification modules (SIMs), where each SIM is associated with a different network through which the UE may communicate.

For example, a first SIM may support communications with a first mobile network operator (MNO) and a second SIM may support communications with a second MNO. Some UEs may support having each of two or more SIMs active concurrently in accordance with dual-SIM dual-active (DSDA) operation, where a first subscriber and second subscriber (e.g., a first SIM and second SIM, which may also be referred to as a first sub and second sub) in connected mode can share RF resources such as RF components and baseband resources. RF components may include RF front-end devices such as transmit chains, transmit power amplifiers (PAs), receive chains, antenna switches, antennas, band select switches, receive low noise amplifiers (LNAs), and the like. Baseband resources may include processing resources (e.g., computational resources) and memory resources that provide computations for maintenance of one or more communication links of the UE, enhancement in quality of the one or more communication links, or any combinations thereof. For example, baseband resources may provide processing resources and memory resources that support a total number of component carriers (CCs) in carrier aggregation in uplink and downlink, a number of multiple-input multiple-output (MIMO) layers, a maximum modulation and coding scheme (MCS) index and modulation scheme, a maximum throughput limit, or any combinations thereof. Such RF front-end devices or components, and baseband resources, may be collectively referred to herein as "resources" or "RF resources" of a UE. Additionally, the RF resources may be shared or separate from "application computational resources" of a UE, which may include resources associated with running a certain application or service associated with a SIM. For example, the application computational resources may include application memory and processing resources (e.g., computation resources, artificial intelligence (AI) resources, machine learning (ML) resources, or any combinations thereof). Further, while various examples discussed herein relate to cellular wireless communications, the described techniques may be used in any type of system in which RF resources of a UE are shared for communications with two or more separate networks, such as wireless local area networks (WLANs) accessed by a UE via associated access points.

In some cases, in order to reduce costs, hardware component space, and processing capacity, multiple SIMs may share a same set of RF resources (e.g., baseband resources, RF components). Further, in some cases, different SIMs may be statically associated with different RF components of a UE, such that when operating in DSDA mode each SIM gets fixed preconfigured resources irrespective of actual loads and conditions associated with the SIM. Such static configurations allow for straightforward UE procedures to report capabilities for each SIM based on the partitioned resources (e.g., rank indicator, number of MIMO layers, number of supported CCs, etc.). However, static partitions of modem hardware may result in one SIM having more capability or less capability than is optimal for particular communications (e.g., voice calls may need relatively lower amounts of hardware resources at a UE than data communications). Thus, techniques for adaptively partitioning RF resources of a UE (e.g., RF components and baseband components) when operating in an DSDA configuration may enhance UE throughput relative to the inflexible static partitions.

In accordance with various techniques as discussed herein, a UE operating in a DSDA configuration may determine a resource partition based on currently active communications at each SIM and a set of available RF resources of the UE. The currently active communications at each SIM may include, in some cases, at least partially concurrent communications in which a first communication of a first SIM is separate and independent of a second communication of a second SIM, where at least a portion of the first communication overlaps in time with at least a portion of the second communication. Based on the determined partition, the UE may transmit communication parameters to a wireless node associated with each SIM (e.g., a first serving cell associated with a first SIM and a second serving cell associated with a second SIM) that are adjusted to provide that the UE is allocated with wireless resource allocations for each wireless node that conform to the determined partition. The UE may adaptively adjust resource partitions and transmit subsequent adjusted parameters to scheduling entities at serving wireless nodes in accordance with changing communications needs at the UE. The factors that can be considered in determining the resource partition at the UE may include, for example, RF components (e.g., number and location of antennas and band combinations), baseband resources (e.g., a number of CCs or MIMO layers that can be supported, a maximum MCS index or throughput that can be supported), power limits (e.g., a maximum uplink power limit or RF exposure limits), and enabled frequencies (e.g., whether frequency range two (FR2) communications are enabled or disabled).

Based on the available resources, the UE may partition the set of RF resources based on a type of service or application that is active on each SIM (e.g., voice or data), an amount of application computational resources associated with each SIM, a priority associated with the service or application, or any combinations thereof. In some cases, the UE may alter one or more reports that are transmitted to the serving wireless nodes associated with each SIM based on the determined partition and measured parameters (e.g., channel state information (CSI) parameters in a CSI report) or reported statuses (e.g., an amount of data reported in a buffer status report or a number of CCs or MIMO layers that the UE can support). The scheduling entities at the serving wireless nodes associated with each SIM will thus provide wireless grants based on the reported values that are in accordance with the determined resource partitions at the UE.

Various aspects of the subject matter described in this disclosure may be implemented to realize one or more of the following potential advantages. For example, based on implementing the techniques of the present disclosure, the UE may use available RF resources for two or more SIMs in which each SIM uses a resource partition that is selected to provide efficient communications at the UE. For example, providing control for the selection of RF resource partitions based on dynamic conditions at the UE may allow for a UE to adjust an amount of RF resources available for each SIM based on current traffic and conditions at each SIM. Such techniques may thus enhance UE efficiency, increase data rates, and provide for enhanced user experience.

Aspects of the disclosure are initially described in the context of wireless communications systems. Examples of UE RF resource partitioning and selection techniques are then described. Aspects of the disclosure are further illustrated by and described with reference to apparatus diagrams, system diagrams, and flowcharts that relate to dynamic modem partitioning techniques for multiple SIMs.

FIG. 1 illustrates an example of a wireless communications system 100 that supports dynamic modem partitioning techniques for multiple SIMs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may support DSDA communications in which communications associated with multiple SIMs may be concurrently performed at the UE 115. Various techniques provided herein describe that such UEs 115 may support identification of a set of available resources for communications at the UE 115, where the set of available resources include multiple RF components (e.g., transmit/receive antennas, transmit/receive chains, transmit PAs, receive LNAs, band select switches, other RF frondend components, or any combinations thereof), RF baseband resources (e.g., processing/computational resources and memory resources that support processing and decoding of a number of CCs in CA, a number of MIMO layers, a MCS index or modulation scheme limit, or a throughput limit), or any combinations thereof. The set of available resources may be shared between multiple SIMs, including a first SIM and a second SIM. In some cases, the UE may identify a resource partition of the set of available resources, with different subsets of resources of the resource partition provide for at least partially concurrent communications of both the first SIM and the second SIM.

Figure 2:
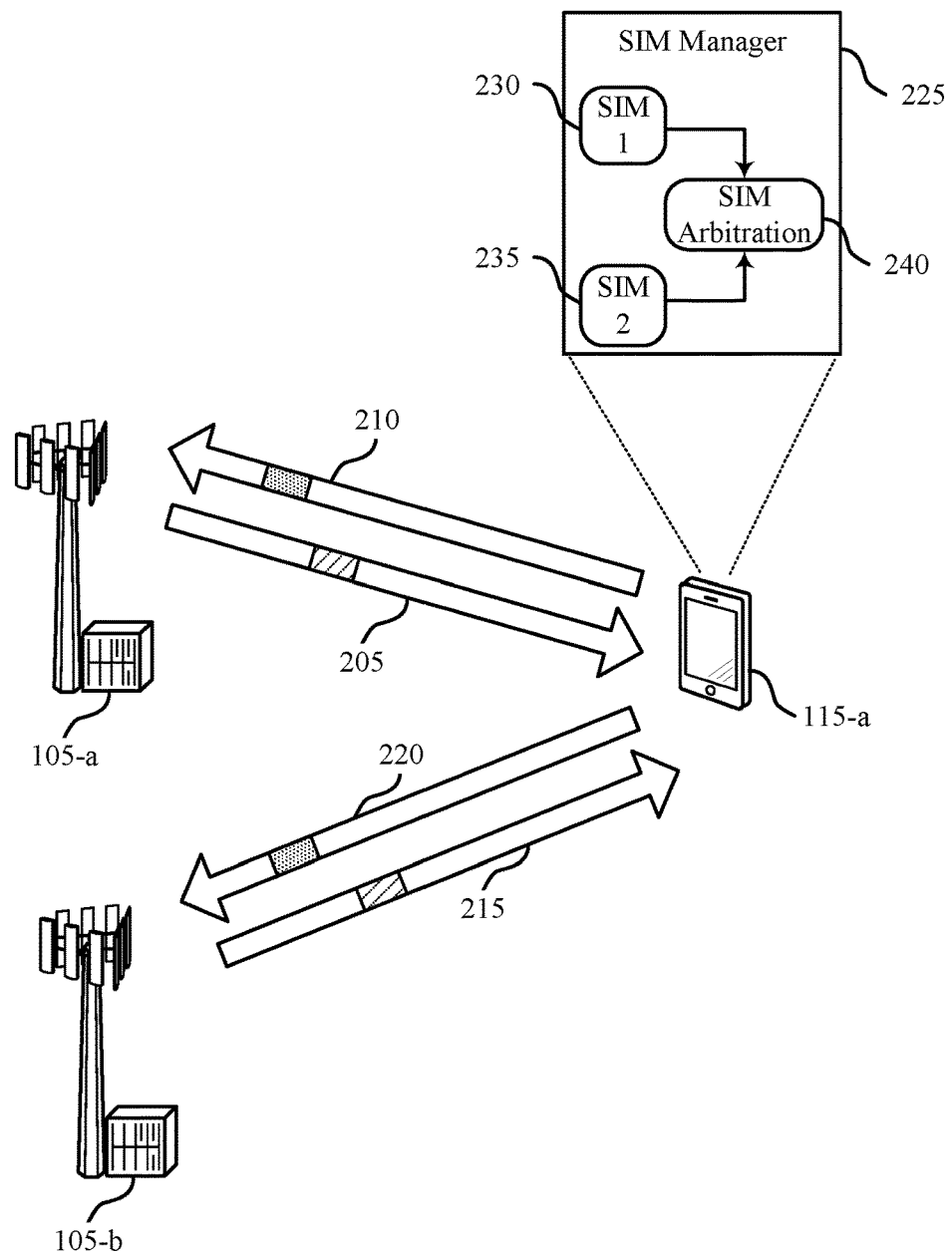
FIG. 2 illustrates an example of a wireless communications system that supports dynamic modem partitioning techniques for multiple SIMs in accordance with aspects of the present disclosure.

FIG. 2 illustrates an example of a wireless communications system 200 that supports dynamic modem partitioning techniques for multiple SIMs in accordance with aspects of the present disclosure. In some examples, wireless communications system 200 may implement aspects of wireless communications system 100. In the example of FIG. 2, wireless communications system 200 may include first base station 105-a, a second base station 105-b, and UE 115-a, which may be examples of the corresponding devices described with respect to FIG. 1. The first base station 105-a may provide communications for a first network associated with a first SIM 230 at the UE 115-a, and the second base station 105-b may provide communications for a second network associated with a second SIM 235 at the UE 115-a. The first base station 105-a may transmit downlink communications 205 to the UE 115-a, and the UE 115-a may transmit uplink communications 210 to the first base station 105-a, where the downlink communications 205 and uplink communications 210 are associated with the first SIM 230. Likewise, the second base station 105-b may transmit downlink communications 215 to the UE 115-a, and the UE 115-a may transmit uplink communications 220 to the second base station 105-b, where the downlink communications 215 and uplink communications 220 are associated with the second SIM 235.

To support communications between first base station 105-a, second base station 105-b, and UE 115-a, each base station 105 may transmit one or more reference signals 250

(e.g., channel state information (CSI) reference signals, synchronization signal blocks (SSBs), demodulation reference signals (DMRSs), tracking reference signals (TRSs), and the like). The UE 115-a may measure one or more metrics of received reference signals 250 and provide measurement reports 255 to the base stations 105. The UE 115-a, in some cases, may identify RF resources for use in uplink and downlink communications based on one or more metrics from the measurements of the reference signals 250, one or more properties of communications associated with each SIM, and a set of available RF resources at the UE 115-a that are available to each SIM.

For example, the first SIM 230 and the second SIM 235 may operate according to a DSDA configuration. Such a DSDA configuration may provide the UE with enhanced capability for multiple different communications with multiple different networks in a concurrent manner. In order to reduce costs and hardware component space, in some cases two or more SIMs may share a same set of RF resources (e.g., RF components, baseband resources, etc.). Techniques such as discussed herein may allow RF resources at the UE 115-a to be partitioned with different partitions provided for each of the first SIM 230 and second SIM 235 in accordance with current conditions associated with each SIM (e.g., an amount of traffic of each SIM, a type of service of each SIM, quality of service (QoS) targets of each SIM, RF conditions, network capability, application computational resources associated with each SIM, or any combinations thereof). In some cases, a SIM arbitration function 240 at a SIM manager 225 may identify available RF resources and determine resource partitions.

Based on a determined resource partition, the UE 115-a may transmit a first indication of supported communication parameters associated with the first SIM 230 in measurement report 255 to the first base station 105-a, and may transmit a second indication of supported communication parameters associated with the second SIM 235 to the second base station 105-b. Each of the base stations 105 may provide wireless allocations (e.g., uplink and downlink grants) to the UE 115-a based on the corresponding indications of supported communication parameters. In some cases, the UE 115-a may adjust the resource partition based on updated conditions at the UE 115-a (e.g., a data buffer associated with each SIM), and transmit supported communication parameters to each base station 105 in accordance with adjusted resource partitions.

In some cases, the supported communication parameters that are indicated for each partition may include, for example, a number of CCs that are supported, a number of supported MIMO layers, a supported MCS index and modulation scheme limit, a supported throughput limit, a CQI that is adjusted based on the associated resource partition, RI that is adjusted based on the associated resource partition, UAI, or any combinations thereof.

Such techniques may allow for efficient use of UE 115-a RF resources based on services that are active for each SIM. For example, if each SIM has data communications associated with enhanced mobile broadband (eMBB) services (e.g., a data+data configuration), the SIM arbitration function 240 may determine the resource partitions for each SIM, for example, based on an amount of data in associated data buffers, a priority of data, QoS targets, and the like. In other examples, the first SIM 230 may have data communications and the second SIM 235 may have voice communications (e.g., a data+voice configuration), in which voice communications may be achieved with fewer RF resources than the data communications. In such cases, the resource partition associated with the first SIM 230 may have additional RF resources than the resources partition associated with the second SIM 235, which may enhance data rates and reduce latency for the data communications while maintaining QoS targets for the voice communications.

In some cases, the UE 115-a may partition the RF resources in a dynamic manner, to allow increases and decreases in capability for each SIM based on various factors, where the capabilities of both SIMs are within a modem maximum capability of a single SIM. In some cases, factors that may considered as inputs to adapt RF resource partitions may include RF component resources such as a location of transmit antennas (e.g., which impacts specific absorption rates (SAR) and maximum permissible exposure (MPE) mitigation and required backoff), a number of available receive antennas, a number of available transmit antennas, supported frequency band combinations, or any combinations thereof. Factors may also include baseband resources, such as a number of CCs in CA that can be supported in uplink and downlink communications, a number of supported MIMO layers, a maximum supported MCS index and modulation scheme, a maximum supported throughput limit, or any combinations thereof. Factors may also include power limits, power density and SAR/MPE limits (e.g., a maximum power limit of the UE, SAR/MPE limits, and power density). Factors may also include whether FR2 resources are enabled for communications associated with one to both SIMs, an amount of application computational resources associated with each SIM, or any combinations thereof.

In some cases, the SIM arbitration function 240 may partition resources based on a type of service associated with each SIM (e.g., Data+Data, Data+Voice, Voice+Data) and the factors related to the RF resources. In some cases, in a data+data state, the SIM arbitration function 240 may consider an uplink data buffer on each SIM, a target throughput (e.g., each SIM can request certain throughput target), an application (e.g., each application may be ranked for throughput requirements), RF conditions, network capability, or any combinations thereof. In some cases, additionally or alternatively, the type of service associated with each SIM may be enhanced mobile broadband (eMBB), mission-critical communications (e.g., URLLC), the massive IoT, sidelink or D2D communications, backhaul communications, or any combinations thereof, which may be used in the determination of resource partitions. Based on the determined resource partitions, the UE 115-a may adjust a reported capability of one or both SIMs to achieve the determined resource partitions. For example, the UE 115-a may adjust, for each SIM, a number of supported CCs, a number of supported MIMO layers, a maximum MCS index and modulation scheme, a throughput limit, or any combinations thereof. In some cases, the UE 115-a may autonomously reduce or increase a modem envelope associated with each SIM, such as by adjusting CQI or RI in measurement reports 255. Additionally or alternatively, the UE 115-a may utilize UE assisted information (UAI) for CA, CC, or receive and transmit layer changes on each SIM.

In cases where the UE 115-a is configured for communications associated with each SIM, the UE 115-a may adjust configured communications, such as by reporting a radio link failure (RLF) to reduce a number of secondary CCs (SCCs) in a CA configuration, by adapting RI and CQI to reduce or increase throughput requests, by adapting RF measurement reports to add one or more SCCs, by utilizing a network capability exchange, by adapting a buffer status report (BSR) associated with one or more of the SIMs to reduce network uplink grants, or any combinations thereof.

Figure 3:
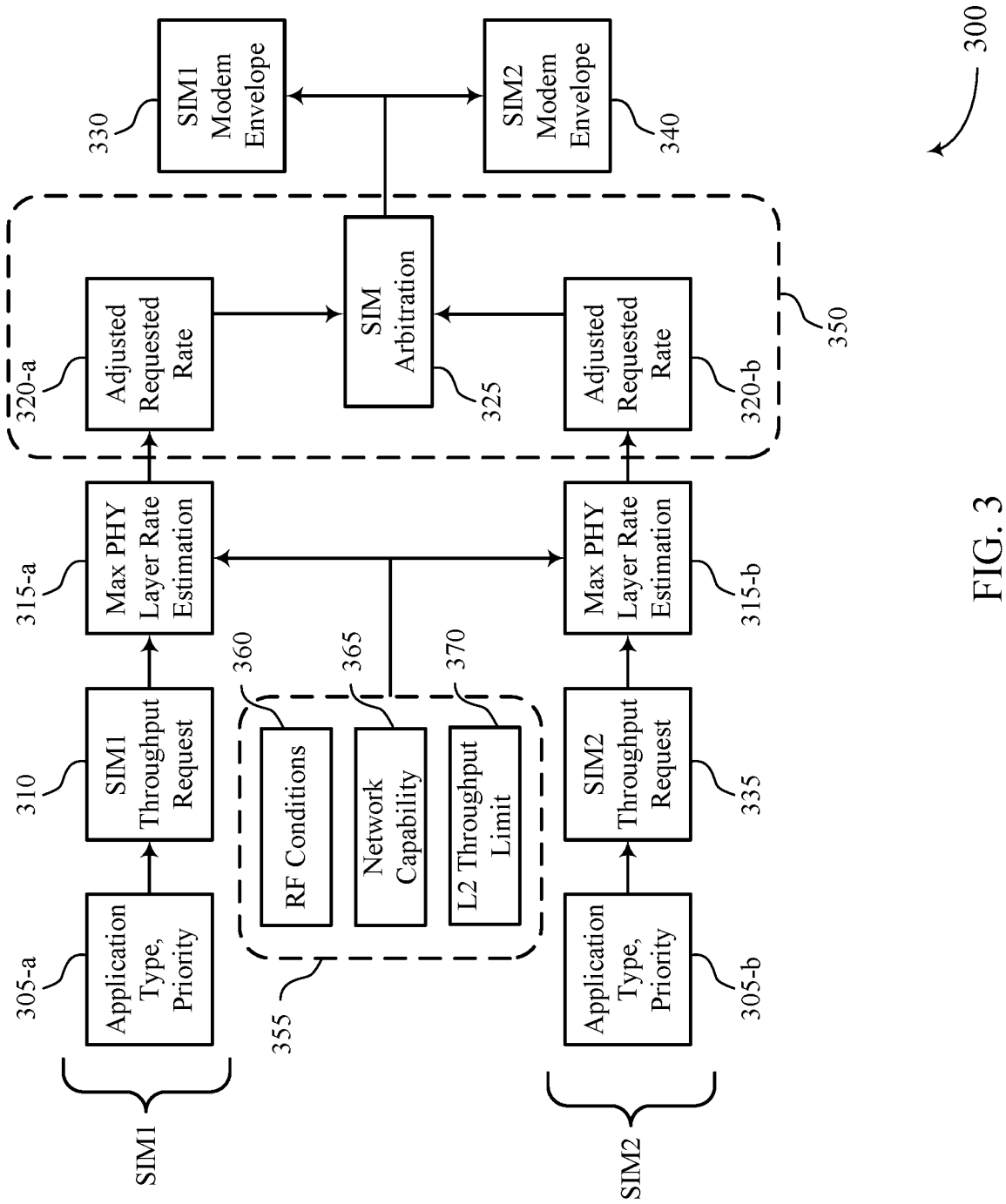
FIG. 3 illustrates an example of a dynamic modem partitioning technique for multiple SIMs in accordance with aspects of the present disclosure.

FIG. 3 illustrates an example of a dynamic modem partitioning technique 300 for multiple SIMs in accordance with aspects of the present disclosure. In some examples, dynamic modem partitioning technique 300 may be implemented by or may implement aspects of wireless communications system 100 or 200, as described with reference to FIGS. 1 and 2. In some examples, operations illustrated in FIG. 3 may be performed by a transmitting device (e.g., a UE) that supports concurrent communication on two networks (e.g., cellular networks or WLANs), as described herein. The operations of the dynamic modem partitioning technique may be implemented by a UE or its components as described herein, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 3 may be performed in a different order than the example order shown, or the operations performed may be performed in different orders or at different times. Some operations may be combined or omitted and other operations may be added to the described functions of FIG. 3.

In this example, operations for each of multiple SIMs, including SIM1 and SIM2, may be performed to determine communication parameters associated with each SIM, which may then be arbitrated to determine partitions of a set of RF resources (which may also be referred to as a modem envelope) that are allocated for communications of each SIM. In the example of FIG. 3, for SIM1, an application type and priority 305-a and a SIM1 throughput request 310 may be identified. Further, for the SIM1, a maximum physical layer rate estimation 315-a may be determined. In this example, the physical layer rate estimation may account for current conditions 355, which may include RF conditions 360, network capability 365, and a throughput limit 370. A SIM manager 350 may determine an adjusted requested rate 320-a for SIM1 based on the application type and priority, throughput request, and physical layer rate estimation. Similarly, for SIM2, the application type and priority 305-b, a SIM2 throughput request 335, and maximum physical layer rate estimation 315-b may be determined and provided to SIM manager 350 to determine the adjusted requested rate 320-b for SIM2. A SIM arbitration function 325 may receive the adjusted requested rates 320 for each SIM, and determine a resource partition associated with each SIM, to provide a SIM1 modem envelope 330 and a SIM2 modem envelope 340. Based on the determined resource partition, the transmitting device may report a set of parameters to a scheduling entities associated with each SIM (e.g., a scheduler at a base station or at a WLAN access point) such that resource grants from the scheduling entities conform to the SIM1 modem envelope 330 and SIM2 modem envelope 340. In some cases, the reported sets of parameters may be adjusted in accordance with techniques as discussed herein to induce the scheduling entities to provide resource grants that can be served by the determined resource partitions.

Figure 4:
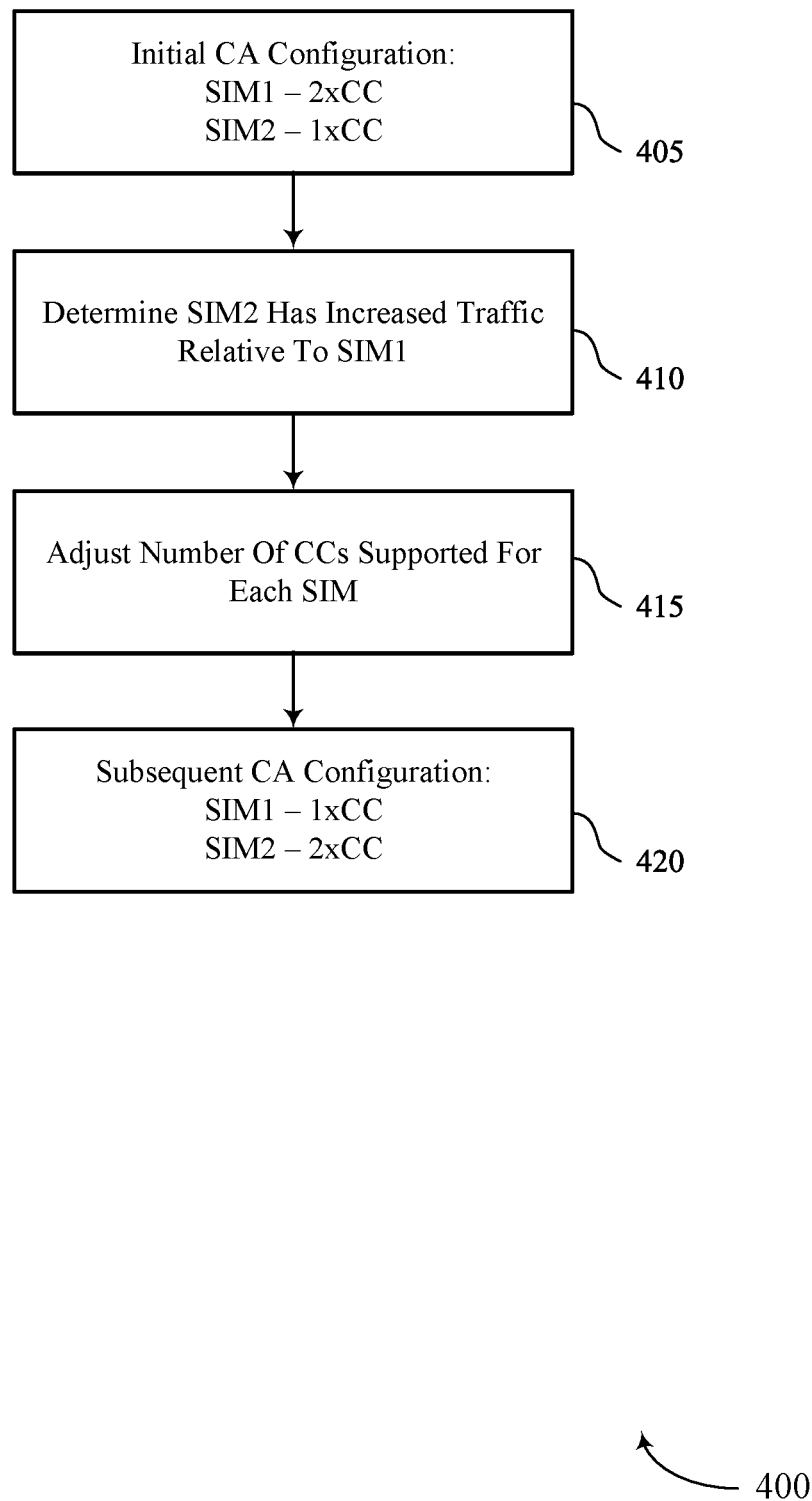
FIG. 4 illustrates an example of a dynamic RF resource allocation that supports dynamic modem partitioning techniques for multiple SIMs in accordance with aspects of the present disclosure.

FIG. 4 illustrates an example of a dynamic RF resource allocation 400 that supports dynamic modem partitioning techniques for multiple SIMs in accordance with aspects of the present disclosure. The operations of the RF resource allocation 400 may be implemented by a UE or its components as described herein. For example, the operations of the dynamic RF resource allocation 400 may be performed by a UE 115 as described with reference to FIGS. 1 and 2, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 4 may be performed in a different order than the example order shown, or the operations performed may be performed in different orders or at different times. Some operations may be combined or omitted and other operations may be added to the dynamic RF resource allocation 400.

In this example, at 405, an initial CA configuration may be in use at the UE. For example, communications associated with a first SIM (SIM1) may be configured with two CCs, and communications associated with a second SIM (SIM2) may be configured with one CC. Further, in this example, RF resources of the UE may support a total of three CCs (e.g., based on available RF components, a band combination, power limits, MCS and throughput limits, etc.). In some cases, the initial CA configuration may be based on an initial traffic ratio associated with the SIMs, service types and priorities of each SIM, throughput targets, supported physical layer rates, and the like, as discussed herein.

At 410, the UE may determine that SIM2 has increased traffic relative to SIM1. For example, a BSR associated with each SIM may show a reduced amount of buffered data associated with SIM1 and an increased amount of buffered data associated with SIM2. In some cases, the UE may periodically evaluate (e.g., based on a timer) the resource partitions associated with the different SIMs, and may make such a determination based on such a periodic evaluation. In some cases, a transmission of a new measurement report or BSR to a network associated with one or more SIMs may trigger an evaluation of the resource partitions.

At 415, the UE may adjust a number of CC supported for each SIM. For example, based on the determination that SIM2 has increased traffic relative to SIM1, the UE may determine an updated resource partition that provides more CCs for SIM2 and fewer CCs for SIM1. As discussed, in this example the UE may support three CCs, and thus may determine that SIM1 should have one CC and that SIM2 should have two CCs. It is to be understood that this example is provided for purposes of discussion and illustration only, and that numerous different examples of resource partitions may be determined based on conditions at a UE and at serving networks of each SIM. Based on the updated resource partition, the UE may transmit one or more measurement reports or other communications to serving nodes associated with each SIM to prompt an adjustment in uplink and downlink grants and number of CCs associated with each SIM.

The serving nodes may adjust the uplink and downlink grants, and change the CC configurations based on the indications provided from the UE. At 420, the UE may have an updated CA configuration, in which SIM1 is configured with one CC, and SIM2 is configured with two CCs. Accordingly, in this example, the UE starts with certain CA envelope on each SIM and, based on network assignments and traffic profile, transitions the capability between SIMs to use available RF resources at the UE more efficiently.

Figure 5:
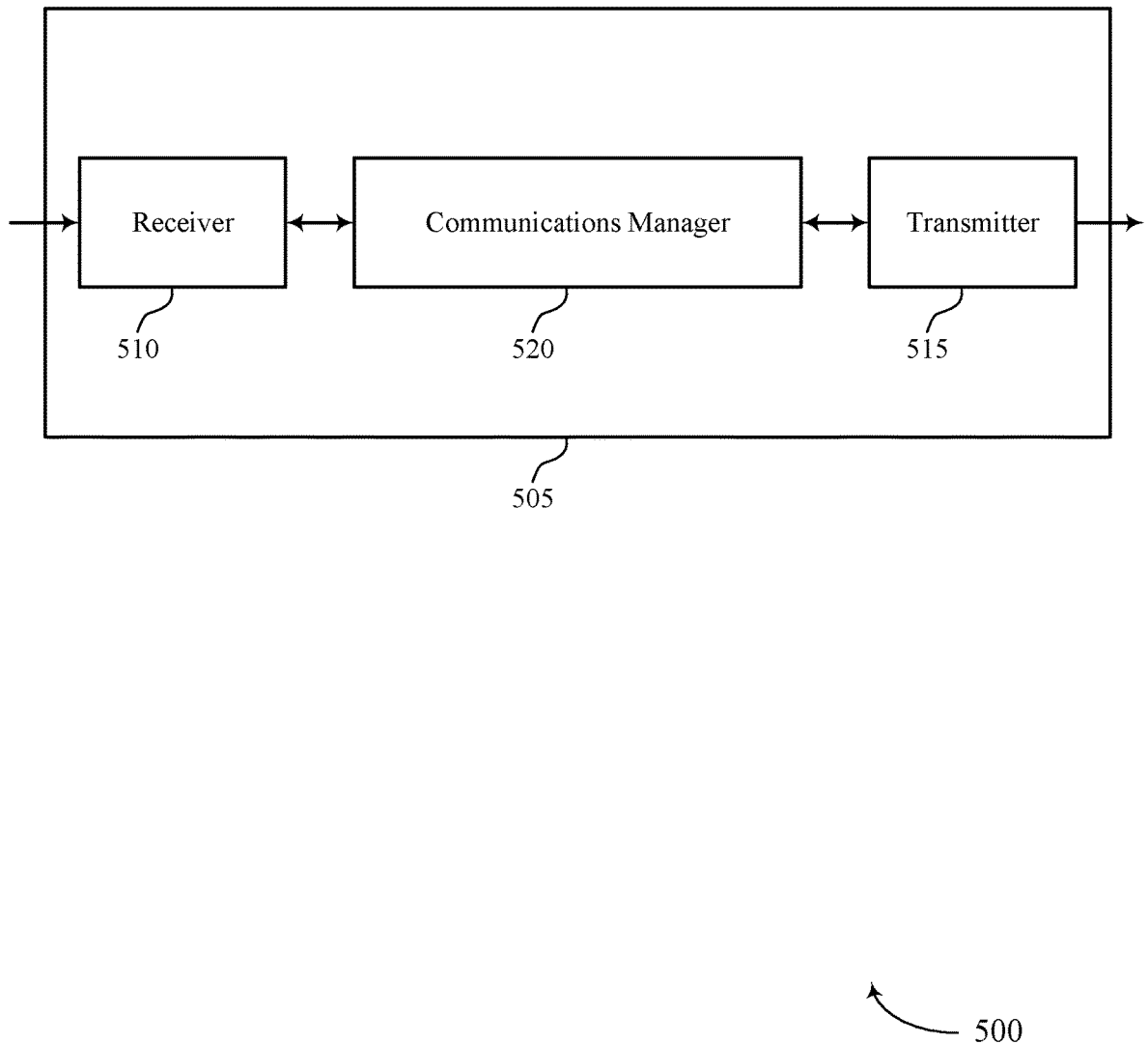
FIGS. 5 and 6 show block diagrams of devices that support dynamic modem partitioning techniques for multiple SIMs in accordance with aspects of the present disclosure.

FIG. 5 shows a block diagram 500 of a device 505 that supports dynamic modem partitioning techniques for multiple SIMs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic modem partitioning techniques for multiple SIMs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic modem partitioning techniques for multiple SIMs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic modem partitioning techniques for multiple SIMs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for identifying a set of available resources for communications at a UE that include one or more baseband resources, one or more radio frequency components, or any combinations thereof, where the set of available resources are shared between a first SIM and a second SIM. The communications manager 520 may be configured as or otherwise support a means for determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The communications manager 520 may be configured as or otherwise support a means for transmitting a first indication of supported communication parameters of the first SIM to a first wireless node and a second indication of supported communication parameters of the second SIM to a second wireless node, where the first indication is based on the first subset of resources and the second indication is based on the second subset of resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient RF resource management for UEs operation using DSDA. Providing control for the selection of RF resources and antennas based on current conditions associated with each SIM may allow for a UE to enhance communications based on traffic and channel conditions associated with each SIM. Such techniques may thus enhance UE efficiency, increase data rates, and provide for enhanced user experience.

Figure 6:
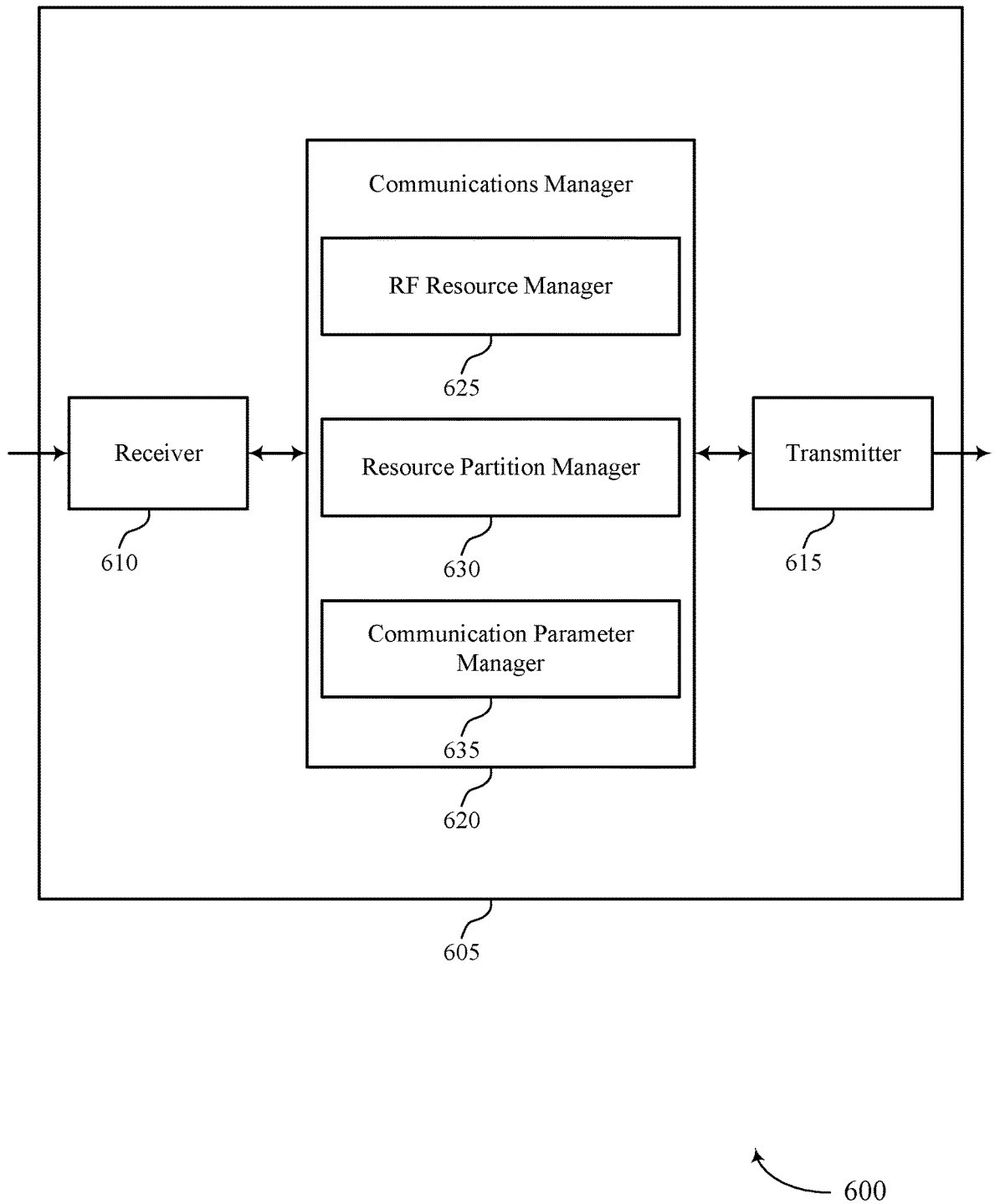

FIG. 6 shows a block diagram 600 of a device 605 that supports dynamic modem partitioning techniques for multiple SIMs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic modem partitioning techniques for multiple SIMs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic modem partitioning techniques for multiple SIMs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic modem partitioning techniques for multiple SIMs as described herein. For example, the communications manager 620 may include an RF resource manager 625, a resource partition manager 630, a communication parameter manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The RF resource manager 625 may be configured as or otherwise support a means for identifying a set of available resources for communications at a UE that include one or more baseband resources, one or more radio frequency components, or any combinations thereof, where the set of available resources are shared between a first SIM and a second SIM. The resource partition manager 630 may be configured as or otherwise support a means for determining, based on a type of service associated with each SIM, one or more communications parameters associated with each SIM, or any combinations thereof, a first resource partition of the set of available resources that includes a first subset of resources for a first communication using the first SIM and a second subset of resources for a second communication using the second SIM, where the first communication and the second communication are at least partially concurrent. The communication parameter manager 635 may be configured as or otherwise support a means for transmitting a first indication of supported communication parameters of the first SIM to a first wireless node and a second indication of supported communication parameters of the second SIM to a second wireless node, where the first indication is based on the first subset of resources and the second indication is based on the second subset of resources.

Figure 7:
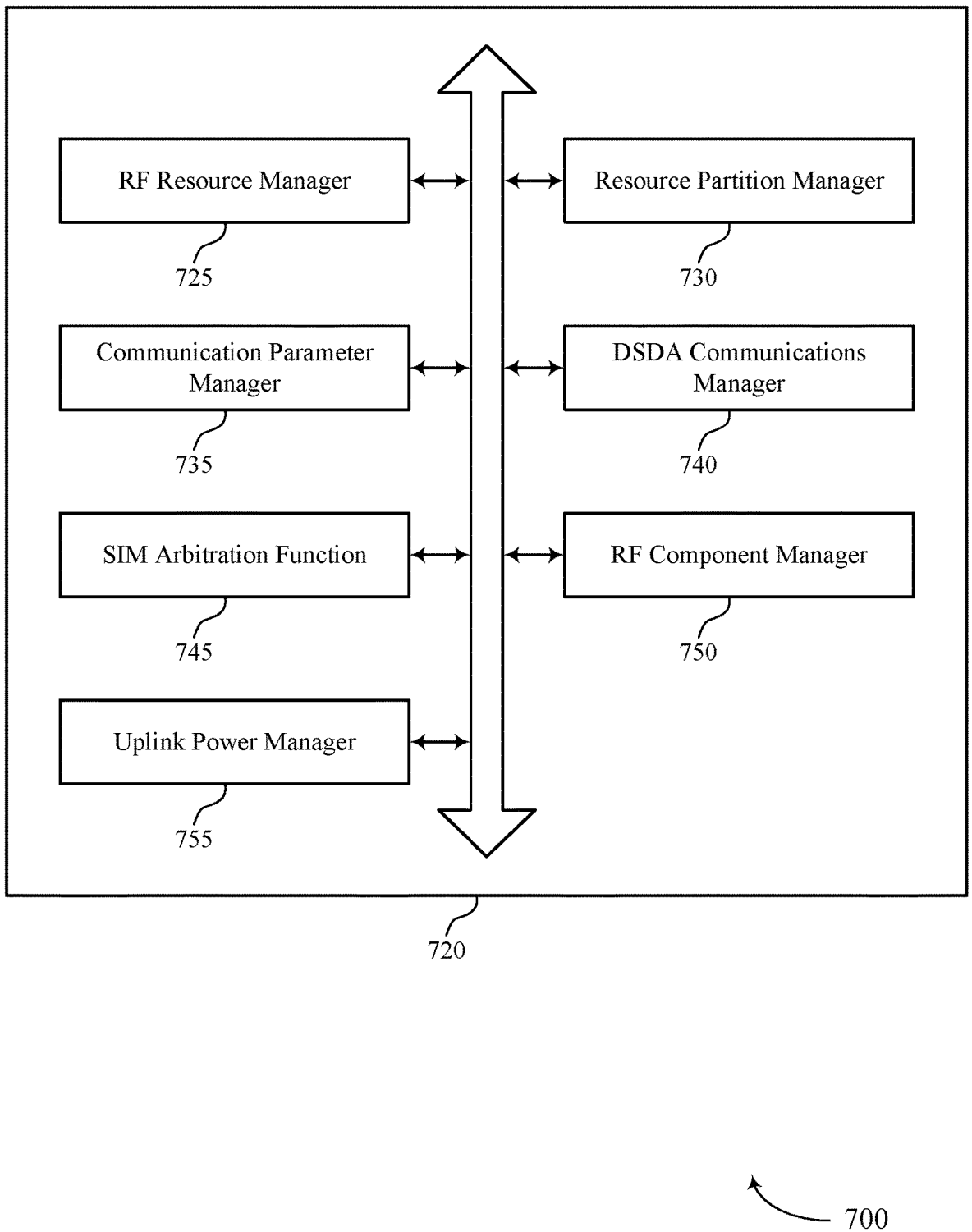
FIG. 7 shows a block diagram of a communications manager that supports dynamic modem partitioning techniques for multiple SIMs in accordance with aspects of the present disclosure.

FIG. 7 shows a block diagram 700 of a communications manager 720 that supports dynamic modem partitioning techniques for multiple SIMs in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic modem partitioning techniques for multiple SIMs as described herein. For example, the communications manager 720 may include an RF resource manager 725, a resource partition manager 730, a communication parameter manager 735, a DSDA communications manager 740, an SIM arbitration function 745, an RF component manager 750, an uplink power manager 755, or any combination thereof. Each of these components may communicate, directly or indirectly, with one another (e.g., via one or more buses).

The communications manager 720 may support wireless communication in accordance with examples as disclosed herein. The RF resource manager 725 may be configured as or otherwise support a means for identifying a set of available resources for communications at a UE that include one or more baseband resources, one or more radio frequency components, or any combinations thereof, where the set of available resources are shared between a first SIM and a second SIM. The resource partition manager 730 may be configured as or otherwise support a means for determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The communication parameter manager 735 may be configured as or otherwise support a means for transmitting a first indication of supported communication parameters of the first SIM to a first wireless node and a second indication of supported communication parameters of the second SIM to a second wireless node, where the first indication is based on the first subset of resources and the second indication is based on the second subset of resources.

In some examples, the DSDA communications manager 740 may be configured as or otherwise support a means for communicating with the first wireless node using the first SIM and with the second wireless node using the second SIM in accordance with the first resource partition. In some examples, the resource partition manager 730 may be configured as or otherwise support a means for determining, subsequent to the communicating, a second resource partition of the set of available resources that includes a third subset of resources for a third communication using the first SIM and fourth subset of resources for a fourth communication using the second SIM, the second resource partition based on one or more updates to the type of service associated with each SIM, the one or more communications parameters associated with each SIM, or any combinations thereof. In some examples, the communication parameter manager 735 may be configured as or otherwise support a means for transmitting a third indication of supported communication parameters of the first SIM to the first wireless node and a fourth indication of supported communication parameters of the second SIM to the second wireless node, where the third indication is based on the third subset of resources and the fourth indication is based on the fourth subset of resources. In some examples, the one or more baseband resources include at least memory resources and computation resources for baseband processing that are shared between the first SIM and the second SIM.

In some examples, to support determining, the resource partition manager 730 may be configured as or otherwise support a means for determining the first resource partition based on portions of the set of available resources that are compatible with communications of the first SIM and the second SIM, one or more power limits associated with the first SIM and the second SIM, one or more frequency bands used for communications of the first SIM and the second SIM, or any combinations thereof. In some examples, to support determining, the resource partition manager 730 may be configured as or otherwise support a means for determining the first resource partition based on a service priority of a highest priority service of each of the first SIM and the second SIM, an amount of data to be transferred for each of the first SIM and the second SIM, channel conditions associated with each of the first SIM and the second SIM, or any combinations thereof.

In some examples, the first indication is transmitted in a first measurement report to the first wireless node and the second indication is transmitted in a second measurement report to the second wireless node, and where each of the first measurement report and the second measurement report provide one or more parameter measurements that generate wireless resource grants for each SIM that are in accordance with the first resource partition. In some examples, the first wireless node is a first serving cell of a first wireless communications system or a first access point of a first wireless local area network, and the second wireless node is a second serving cell of a second wireless communications system or a second access point of a second wireless local area network.

In some examples, the determining is performed at a SIM arbitration function of the UE based on a requested data rate associated with each SIM and the set of available resources. In some examples, the first resource partition is further determined based on a location of one or more transmit antennas in the set of available resources, a number of receive antennas in the set of available resources, a number of transmit antennas in the set of available resources, a set of band combinations associated with each of the first SIM and the second SIM, or any combinations thereof.

In some examples, the one or more baseband resources include one or more of a number of uplink component carriers that are supported by the UE for uplink carrier aggregation across both the first SIM and the second SIM, a number of downlink component carriers that are supported by the UE for downlink carrier aggregation across both the first SIM and the second SIM, a number of multiple-input multiple-output (MIMO) layers supported by the UE across both the first SIM and the second SIM, a maximum modulation order and coding rate supported by the UE across both the first SIM and the second SIM, a maximum throughput limit supported by the UE across both the first SIM and the second SIM, or any combinations thereof.

In some examples, the first resource partition is further determined based on one or more of a combined power limit for communications across both the first SIM and the second SIM for a time period, a specific absorption rate (SAR) limit for communications of one or both the first SIM or the second SIM for the time period, a maximum permissible exposure (MPE) limit for communications for one or both the first SIM or the second SIM for the time period, or any combinations thereof.

In some examples, the first resource partition is further determined based on a first set of frequency bands associated with communications of the first SIM, a second set of frequency bands associated with communications of the second SIM, a frequency range of one or more of the first set of frequency bands or the second set of frequency bands, or any combinations thereof. In some examples, the first resource partition is further determined based on one or more types of service associated with communications of the first SIM and the second SIM, where the one or more types of service include data services or voice services, and where data services are associated with different resources than voice services.

In some examples, the first resource partition is further determined based on an amount of data in an uplink buffer of each of the SIM and the second SIM, a target data throughput associated with each of the first SIM and the second SIM, a priority associated with the one or more types of service associated with communications of the first SIM and the second SIM, or any combinations thereof. In some examples, the first resource partition is further determined based on one or more channel conditions associated with each of the first SIM and the second SIM, a network capability associated with each of the first SIM and the second SIM, or any combinations thereof.

In some examples, the RF resource manager 725 may be configured as or otherwise support a means for determining, for the first SIM based on the first resource partition, the first indication that provides one or more of a first number of supported CCs, a first number of supported MIMO layers, a first MCS limit, a first throughput limit, or any combinations thereof. In some examples, the RF resource manager 725 may be configured as or otherwise support a means for determining, for the second SIM based on the first resource partition, the second indication that provides one or more of a second number of supported CCs, a second number of supported MIMO layers, a second MCS limit, a second throughput limit, or any combinations thereof. In some examples, the first indication includes one or more of a CQI or a RI for the first SIM, and where a reported CQI value or RI value is adjusted based on the first resource partition. In some examples, to support transmitting, the communication parameter manager 735 may be configured as or otherwise support a means for transmitting UE assisted information (UAI) to one or more of the first wireless node or the second wireless node to adapt communications parameters in accordance with the first resource partition. In some examples, one or more connected mode or idle mode measurements of the first SIM are increased or decreased to adapt communications parameters of the first SIM in accordance with the first resource partition, and where corresponding measurements of the second SIM are adjusted in accordance with the measurements of the first SIM to achieve the first resource partition.

In some examples, the DSDA communications manager 740 may be configured as or otherwise support a means for selecting, for communications associated with the first SIM, a different serving wireless node based on the first resource partition. In some examples, the DSDA communications manager 740 may be configured as or otherwise support a means for transmitting a request to the first wireless node to switch communications associated with the first SIM from the first wireless node to the different serving wireless node.

Figure 8:
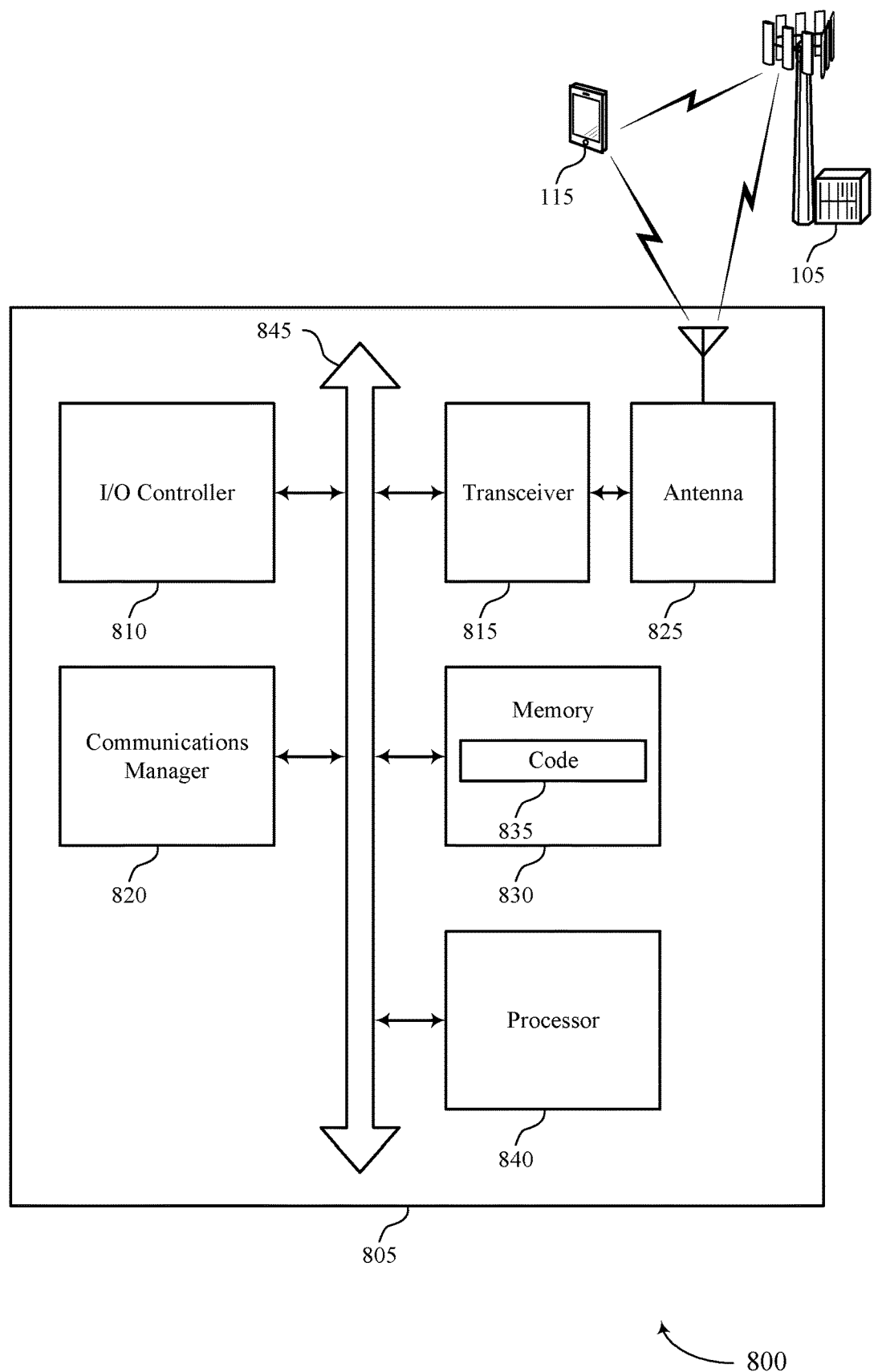
FIG. 8 shows a diagram of a system including a device that supports dynamic modem partitioning techniques for multiple SIMs in accordance with aspects of the present disclosure.

FIG. 8 shows a diagram of a system 800 including a device 805 that supports dynamic modem partitioning techniques for multiple SIMs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic modem partitioning techniques for multiple SIMs). For example, the device 805 or a component of the device 805 may include a processor 840 and memory 830 coupled to the processor 840, the processor 840 and memory 830 configured to perform various functions described herein.

The communications manager 820 may support wireless communication in accordance with examples as disclosed herein. For example, the communications manager 820 may be configured as or otherwise support a means for identifying a set of available resources for communications at a UE that include one or more baseband resources, one or more radio frequency components, or any combinations thereof, where the set of available resources are shared between a first SIM and a second SIM. The communications manager 820 may be configured as or otherwise support a means for determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The communications manager 820 may be configured as or otherwise support a means for transmitting a first indication of supported communication parameters of the first SIM to a first wireless node and a second indication of supported communication parameters of the second SIM to a second wireless node, where the first indication is based on the first subset of resources and the second indication is based on the second subset of resources.

By including or configuring the communications manager 820 in accordance with examples as described herein, the device 805 may support techniques for efficient RF resource management for UEs operation using DSDA. Providing control for the selection of RF resources and antennas based on current conditions associated with each SIM may allow for a UE to enhance communications based on traffic and channel conditions associated with each SIM. Such techniques may thus enhance UE efficiency, increase data rates, reduce latency, and provide for enhanced user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic modem partitioning techniques for multiple SIMs as described herein, or the processor 840 and the memory 830 may be otherwise configured to perform or support such operations.

Figure 9:
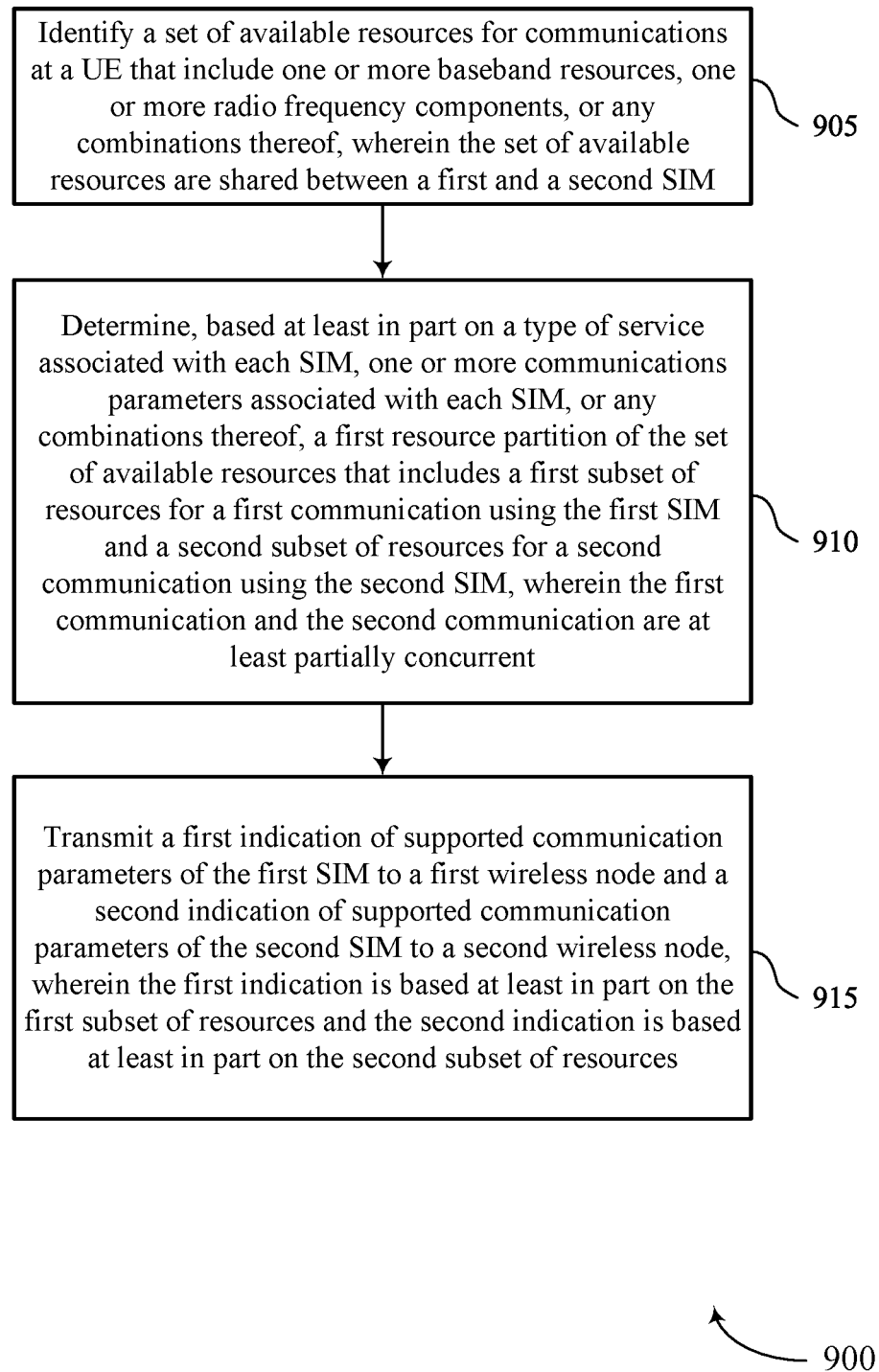
FIGS. 9 through 11 show flowcharts illustrating methods that support dynamic modem partitioning techniques for multiple SIMs in accordance with aspects of the present disclosure.

FIG. 9 shows a flowchart illustrating a method 900 that supports dynamic modem partitioning techniques for multiple SIMs in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying a set of available resources for communications at a UE that include one or more baseband resources, one or more radio frequency components, or any combinations thereof, where the set of available resources are shared between a first SIM and a second SIM. The operations of 905 may be performed in accordance with examples as disclosed herein. In some examples, aspects of the operations of 905 may be performed by an RF resource manager 725 as described with reference to FIG. 7. In some examples, the one or more baseband resources include at least memory resources and computation resources for baseband processing that are shared between the first SIM and the second SIM.

At 910, the method may include determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The operations of 910 may be performed in accordance with examples as disclosed herein. In some examples, aspects of the operations of 910 may be performed by a resource partition manager 730 as described with reference to FIG. 7.

At 915, the method may include transmitting a first indication of supported communication parameters of the first SIM to a first wireless node and a second indication of supported communication parameters of the second SIM to a second wireless node, where the first indication is based on the first subset of resources and the second indication is based on the second subset of resources. The operations of 915 may be performed in accordance with examples as disclosed herein. In some examples, aspects of the operations of 915 may be performed by a communication parameter manager 735 as described with reference to FIG. 7.

Figure 10:
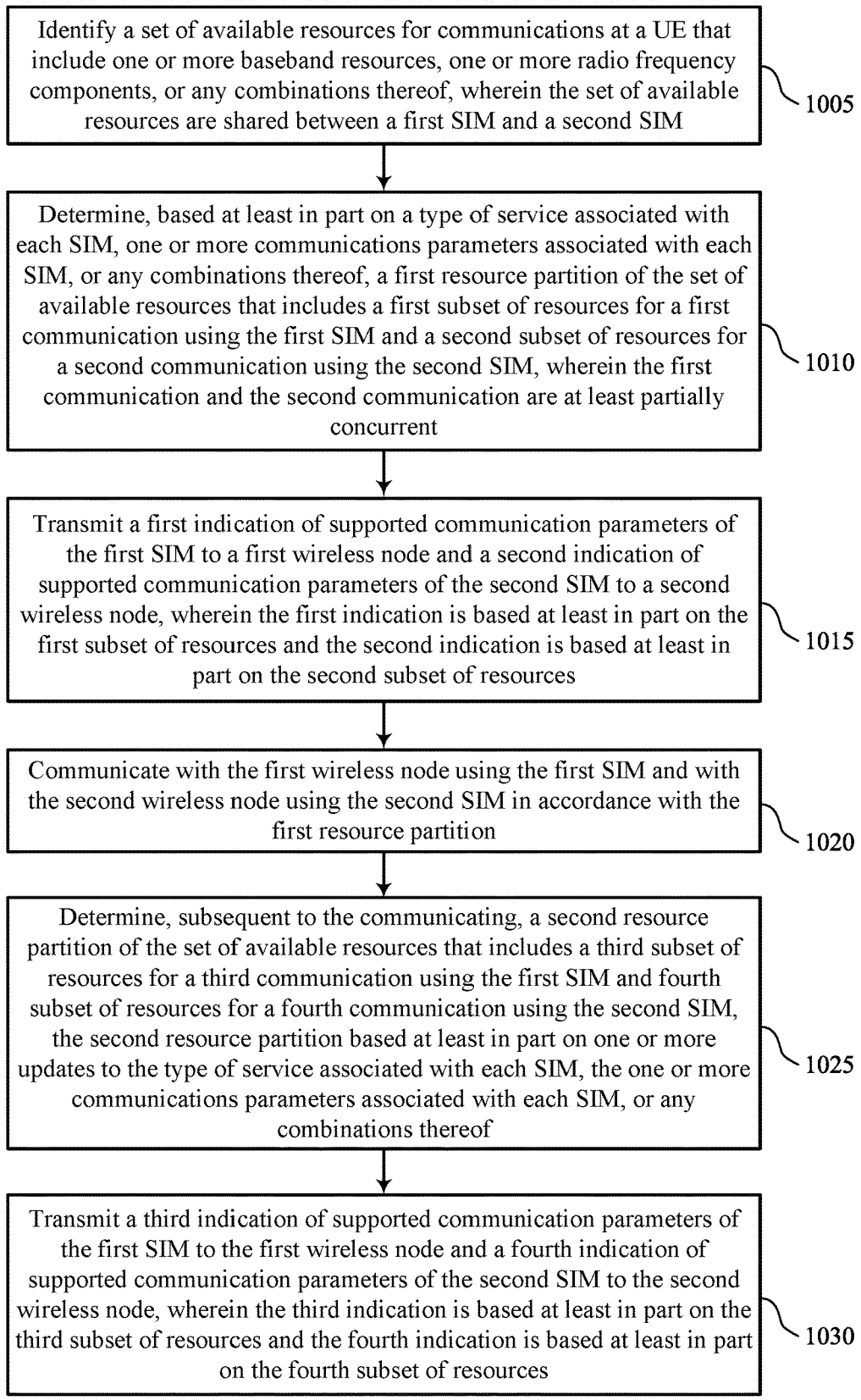

FIG. 10 shows a flowchart illustrating a method 1000 that supports dynamic modem partitioning techniques for multiple SIMs in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying a set of available resources for communications at a UE that include one or more baseband resources, one or more radio frequency components, or any combinations thereof, where the set of available resources are shared between a first SIM and a second SIM. The operations of 1005 may be performed in accordance with examples as disclosed herein. In some examples, aspects of the operations of 1005 may be performed by an RF resource manager 725 as described with reference to FIG. 7.

At 1010, the method may include determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The operations of 1010 may be performed in accordance with examples as disclosed herein. In some examples, aspects of the operations of 1010 may be performed by a resource partition manager 730 as described with reference to FIG. 7.

At 1015, the method may include transmitting a first indication of supported communication parameters of the first SIM to a first wireless node and a second indication of supported communication parameters of the second SIM to a second wireless node, where the first indication is based on the first subset of resources and the second indication is based on the second subset of resources. The operations of 1015 may be performed in accordance with examples as disclosed herein. In some examples, aspects of the operations of 1015 may be performed by a communication parameter manager 735 as described with reference to FIG. 7.

At 1020, the method may include communicating with the first wireless node using the first SIM and with the second wireless node using the second SIM in accordance with the first resource partition. The operations of 1020 may be performed in accordance with examples as disclosed herein. In some examples, aspects of the operations of 1020 may be performed by a DSDA communications manager 740 as described with reference to FIG. 7.

At 1025, the method may include determining, subsequent to the communicating, a second resource partition of the set of available resources that includes a third subset of resources for a third communication using the first SIM and fourth subset of resources for a fourth communication using the second SIM, the second resource partition based on one or more updates to the type of service associated with each SIM, the one or more communications parameters associated with each SIM, or any combinations thereof. The operations of 1025 may be performed in accordance with examples as disclosed herein. In some examples, aspects of the operations of 1025 may be performed by a resource partition manager 730 as described with reference to FIG. 7.

At 1030, the method may include transmitting a third indication of supported communication parameters of the first SIM to the first wireless node and a fourth indication of supported communication parameters of the second SIM to the second wireless node, where the third indication is based on the third subset of resources and the fourth indication is based on the fourth subset of resources. The operations of 1030 may be performed in accordance with examples as disclosed herein. In some examples, aspects of the operations of 1030 may be performed by a communication parameter manager 735 as described with reference to FIG. 7.

Figure 11:
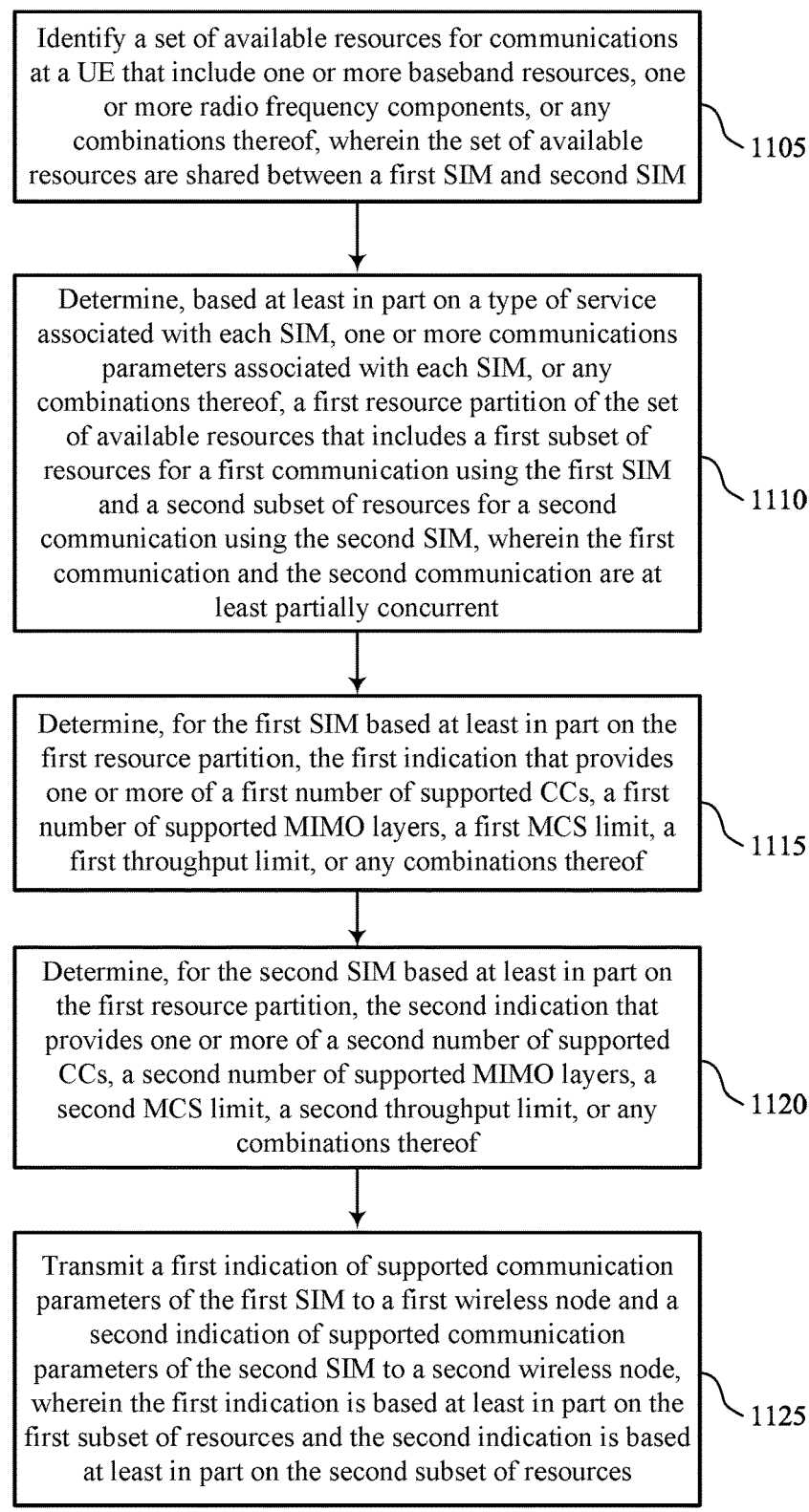

FIG. 11 shows a flowchart illustrating a method 1100 that supports dynamic modem partitioning techniques for multiple SIMs in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a set of available resources for communications at a UE that include one or more baseband resources, one or more radio frequency components, or any combinations thereof, where the set of available resources are shared between a first SIM and a second SIM. The operations of 1105 may be performed in accordance with examples as disclosed herein. In some examples, aspects of the operations of 1105 may be performed by an RF resource manager 725 as described with reference to FIG. 7.

At 1110, the method may include determining a first resource partition of the set of available resources that includes a first subset of resources for a first communication using the first SIM and a second subset of resources for a second communication using the second SIM, where the first communication and the second communication are at least partially concurrent, and where the first resource partition is determined based at least in part on a type of service associated with each SIM, one or more communications parameters associated with each SIM, or any combinations thereof. The operations of 1110 may be performed in accordance with examples as disclosed herein. In some examples, aspects of the operations of 1110 may be performed by a resource partition manager 730 as described with reference to FIG. 7.

At 1115, the method may include determining, for the first SIM based on the first resource partition, the first indication that provides one or more of a first number of supported CCs, a first number of supported MIMO layers, a first MCS limit, a first throughput limit, or any combinations thereof. The operations of 1115 may be performed in accordance with examples as disclosed herein. In some examples, aspects of the operations of 1115 may be performed by an RF resource manager 725 as described with reference to FIG. 7.

At 1120, the method may include determining, for the second SIM based on the first resource partition, the second indication that provides one or more of a second number of supported CCs, a second number of supported MIMO layers, a second MCS limit, a second throughput limit, or any combinations thereof. The operations of 1120 may be performed in accordance with examples as disclosed herein. In some examples, aspects of the operations of 1120 may be performed by an RF resource manager 725 as described with reference to FIG. 7.

At 1125, the method may include transmitting a first indication of supported communication parameters of the first SIM to a first wireless node and a second indication of supported communication parameters of the second SIM to a second wireless node, where the first indication is based on the first subset of resources and the second indication is based on the second subset of resources. The operations of 1125 may be performed in accordance with examples as disclosed herein. In some examples, aspects of the operations of 1125 may be performed by a communication parameter manager 735 as described with reference to FIG. 7.

The following provides an overview of aspects of the present disclosure:

Aspect 1: A method for wireless communication at a user equipment (UE), comprising: identifying a set of available resources for communications at the UE that include one or more baseband resources, one or more radio frequency components, or any combinations thereof, wherein the set of available resources are shared between a first subscriber identification module (SIM) and a second SIM; determining a first resource partition of the set of available resources that includes a first subset of resources for a first communication using the first SIM and a second subset of resources for a second communication using the second SIM, wherein the first communication and the second communication are at least partially concurrent, and wherein the first resource partition is determined based at least in part on a type of service associated with each SIM, one or more communications parameters associated with each SIM, or any combinations thereof, and transmitting a first indication of supported communication parameters of the first SIM to a first wireless node and a second indication of supported communication parameters of the second SIM to a second wireless node, wherein the first indication is based at least in part on the first subset of resources and the second indication is based at least in part on the second subset of resources.

Aspect 2: The method of aspect 1, further comprising: communicating with the first wireless node using the first SIM and with the second wireless node using the second SIM in accordance with the first resource partition; determining, subsequent to the communicating, a second resource partition of the set of available resources that includes a third subset of resources for a third communication using the first SIM and fourth subset of resources for a fourth communication using the second SIM, the second resource partition based at least in part on one or more updates to the type of service associated with each SIM, the one or more communications parameters associated with each SIM, or any combinations thereof; and transmitting a third indication of supported communication parameters of the first SIM to the first wireless node and a fourth indication of supported communication parameters of the second SIM to the second wireless node, wherein the third indication is based at least in part on the third subset of resources and the fourth indication is based at least in part on the fourth subset of resources.

Aspect 3: The method of any of aspects 1 through 2, wherein the determining further comprises: determining the first resource partition based at least in part on portions of the set of available resources that are compatible with communications of the first SIM and the second SIM, one or more power limits associated with the first SIM and the second SIM, one or more frequency bands used for communications of the first SIM and the second SIM, or any combinations thereof.

Aspect 4: The method of any of aspects 1 through 3, wherein the determining further comprises: determining the first resource partition based at least in part on a service priority of a highest priority service of each of the first SIM and the second SIM, an amount of data to be transferred for each of the first SIM and the second SIM, channel conditions associated with each of the first SIM and the second SIM, or any combinations thereof.

Aspect 5: The method of any of aspects 1 through 4, wherein the first indication is transmitted in a first measurement report to the first wireless node and the second indication is transmitted in a second measurement report to the second wireless node, and wherein each of the first measurement report and the second measurement report provide one or more parameter measurements that generate wireless resource grants for each SIM that are in accordance with the first resource partition.

Aspect 6: The method of any of aspects 1 through 5, wherein the first wireless node is a first serving cell of a first wireless communications system or a first access point of a first wireless local area network, and the second wireless node is a second serving cell of a second wireless communications system or a second access point of a second wireless local area network.

Aspect 7: The method of any of aspects 1 through 6, wherein the determining is performed at a SIM arbitration function of the UE based at least in part on a requested data rate associated with each SIM and the set of available resources.

Aspect 8: The method of any of aspects 1 through 7, wherein the first resource partition is further determined based at least in part on a location of one or more transmit antennas in the set of available resources, a number of receive antennas in the set of available resources, a number of transmit antennas in the set of available resources, a set of band combinations associated with each of the first SIM and the second SIM, or any combinations thereof.

Aspect 9: The method of any of aspects 1 through 8, wherein the one or more baseband resources include one or more of a number of uplink component carriers that are supported by the UE for uplink carrier aggregation across both the first SIM and the second SIM, a number of downlink component carriers that are supported by the UE for downlink carrier aggregation across both the first SIM and the second SIM, a number of multiple-input multiple-output (MIMO) layers supported by the UE across both the first SIM and the second SIM, a maximum modulation order and coding rate supported by the UE across both the first SIM and the second SIM, a maximum throughput limit supported by the UE across both the first SIM and the second SIM, or any combinations thereof.

Aspect 10: The method of any of aspects 1 through 9, wherein the first resource partition is further determined based at least in part on one or more of a combined power limit for communications across both the first SIM and the second SIM for a time period, a specific absorption rate (SAR) limit for communications of one or both the first SIM or the second SIM for the time period, a maximum permissible exposure (MPE) limit for communications for one or both the first SIM or the second SIM for the time period, or any combinations thereof.

Aspect 11: The method of any of aspects 1 through 10, wherein the first resource partition is further determined based at least in part on a first set of frequency bands associated with communications of the first SIM, a second set of frequency bands associated with communications of the second SIM, a frequency range of one or more of the first set of frequency bands or the second set of frequency bands, or any combinations thereof.

Aspect 12: The method of any of aspects 1 through 11, wherein the first resource partition is further determined based at least in part on one or more types of service associated with communications of the first SIM and the second SIM, wherein the one or more types of service include data services or voice services, and wherein data services are associated with different resources than voice services.

Aspect 13: The method of aspect 12, wherein the first resource partition is further determined based at least in part on an amount of data to be in an uplink buffer of each of the SIM and the second SIM, a target data throughput associated with each of the first SIM and the second SIM, a priority associated with the one or more types of service associated with communications of the first SIM and the second SIM, or any combinations thereof.

Aspect 14: The method of any of aspects 1 through 13, wherein the first resource partition is further determined based at least in part on one or more channel conditions associated with each of the first SIM and the second SIM, a network capability associated with each of the first SIM and the second SIM, or any combinations thereof.

Aspect 15: The method of any of aspects 1 through 14, further comprising: determining, for the first SIM based at least in part on the first resource partition, the first indication that provides one or more of a first number of supported component carriers (CCs), a first number of supported multiple-input multiple-output (MIMO) layers, a first modulation and coding scheme (MCS) limit, a first throughput limit, or any combinations thereof and determining, for the second SIM based at least in part on the first resource partition, the second indication that provides one or more of a second number of supported CCs, a second number of supported MIMO layers, a second MCS limit, a second throughput limit, or any combinations thereof.

Aspect 16: The method of any of aspects 1 through 15, wherein the first indication includes one or more of a channel quality indicator (CQI) or a rank indicator (RI) for the first SIM, and wherein a reported CQI value or RI value is adjusted based at least in part on the first resource partition.

Aspect 17: The method of any of aspects 1 through 16, wherein the transmitting further comprises: transmitting UE assisted information (UAI) to one or more of the first wireless node or the second wireless node to adapt communications parameters in accordance with the first resource partition.

Aspect 18: The method of any of aspects 1 through 17, wherein one or more connected mode or idle mode measurements of the first SIM are increased or decreased to adapt communications parameters of the first SIM in accordance with the first resource partition, and wherein corresponding measurements of the second SIM are adjusted in accordance with the measurements of the first SIM to achieve the first resource partition.

Aspect 19: The method of any of aspects 1 through 18, further comprising: selecting, for communications associated with the first SIM, a different serving wireless node based at least in part on the first resource partition; and transmitting a request to the first wireless node to switch communications associated with the first SIM from the first wireless node to the different serving wireless node.

Aspect 20: An apparatus for wireless communication, comprising a processor; memory coupled with the processor; and instructions stored in the memory and executable by the processor to cause the apparatus to perform a method of any of aspects 1 through 19.

Aspect 21: An apparatus for wireless communication, comprising at least one means for performing a method of any of aspects 1 through 19.

Aspect 22: A non-transitory computer-readable medium storing code for wireless communication, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying a set of available resources for communications at the UE that include one or more baseband resources, one or more radio frequency components, or any combinations thereof, wherein the set of available resources are shared between a first subscriber identification module (SIM) and a second SIM;
   determining a first resource partition of the set of available resources that includes a first subset of resources for a first communication using the first SIM and a second subset of resources for a second communication using the second SIM, wherein the first communication and the second communication are at least partially concurrent, and wherein the first resource partition is determined based at least in part on a type of service associated with each SIM, one or more communications parameters associated with each SIM, or any combinations thereof; and transmitting a first indication of supported communication parameters of the first SIM to a first wireless node and a second indication of supported communication parameters of the second SIM to a second wireless node, wherein the first indication is based at least in part on the first subset of resources and the second indication is based at least in part on the second subset of resources, wherein each of the first indication of the supported communication parameters of the first SIM and the second indication of the supported communication parameters of the second SIM comprise one or more of a quantity of supported component carriers, a quantity of supported multiple-input multiple-output layers, a modulation and coding scheme index limit, a modulation scheme limit, or a throughput limit.

2. The method of claim 1, wherein the one or more baseband resources include at least memory resources and computation resources for baseband processing that are shared between the first SIM and the second SIM.

3. The method of claim 1, further comprising:
communicating with the first wireless node using the first SIM and with the second wireless node using the second SIM in accordance with the first resource partition;

determining, subsequent to the communicating, a second resource partition of the set of available resources that includes a third subset of resources for a third communication using the first SIM and fourth subset of resources for a fourth communication using the second SIM, the second resource partition based at least in part on one or more updates to the type of service associated with each SIM, the one or more communications parameters associated with each SIM, or any combinations thereof; and transmitting a third indication of supported communication parameters of the first SIM to the first wireless node and a fourth indication of supported communication parameters of the second SIM to the second wireless node, wherein the third indication is based at least in part on the third subset of resources and the fourth indication is based at least in part on the fourth subset of resources.

4. The method of claim 1, wherein the determining further comprises:
determining the first resource partition based at least in part on portions of the set of available resources that are compatible with communications of the first SIM and the second SIM, one or more power limits associated with the first SIM and the second SIM, one or more frequency bands used for communications of the first SIM and the second SIM, or any combinations thereof.

5. The method of claim 1, wherein the determining further comprises:
determining the first resource partition based at least in part on a service priority of a highest priority service of each of the first SIM and the second SIM, an amount of data to be transferred for each of the first SIM and the second SIM, channel conditions associated with each of the first SIM and the second SIM, or any combinations thereof.

6. The method of claim 1, wherein the first indication is transmitted in a first measurement report to the first wireless node and the second indication is transmitted in a second measurement report to the second wireless node, and wherein each of the first measurement report and the second measurement report provide one or more parameter measurements that generate wireless resource grants for each SIM that are in accordance with the first resource partition.

7. The method of claim 1, wherein the first wireless node is a first serving cell of a first wireless communications system or a first access point of a first wireless local area network, and the second wireless node is a second serving cell of a second wireless communications system or a second access point of a second wireless local area network.

8. The method of claim 1, wherein the determining is performed at a SIM arbitration function of the UE based at least in part on a requested data rate associated with each SIM and the set of available resources.

9. The method of claim 1, wherein the first resource partition is further determined based at least in part on a location of one or more transmit antennas in the set of available resources, a number of receive antennas in the set of available resources, a number of transmit antennas in the set of available resources, a set of band combinations associated with each of the first SIM and the second SIM, or any combinations thereof.

10. The method of claim 1, wherein the one or more baseband resources include one or more of a number of uplink component carriers that are supported by the UE for uplink carrier aggregation across both the first SIM and the second SIM, a number of downlink component carriers that are supported by the UE for downlink carrier aggregation across both the first SIM and the second SIM, a number of multiple-input multiple-output (MIMO) layers supported by the UE across both the first SIM and the second SIM, a maximum modulation order and coding rate supported by the UE across both the first SIM and the second SIM, a maximum throughput limit supported by the UE across both the first SIM and the second SIM, or any combinations thereof.

11. The method of claim 1, wherein the first resource partition is further determined based at least in part on one or more of a combined power limit for communications across both the first SIM and the second SIM for a time period, a specific absorption rate (SAR) limit for communications of one or both the first SIM or the second SIM for the time period, a maximum permissible exposure (MPE) limit for communications for one or both the first SIM or the second SIM for the time period, or any combinations thereof.

12. The method of claim 1, wherein the first resource partition is further determined based at least in part on a first set of frequency bands associated with communications of the first SIM, a second set of frequency bands associated with communications of the second SIM, a frequency range of one or more of the first set of frequency bands or the second set of frequency bands, or any combinations thereof.

13. The method of claim 1, wherein the first resource partition is further determined based at least in part on one or more types of service associated with communications of the first SIM and the second SIM, wherein the one or more types of service include data services or voice services, and wherein data services are associated with different resources than voice services.

14. The method of claim 13, wherein the first resource partition is further determined based at least in part on an amount of data in an uplink buffer of each of the SIM and the second SIM, a target data throughput associated with each of the first SIM and the second SIM, a priority associated with the one or more types of service associated with communications of the first SIM and the second SIM, or any combinations thereof.

15. The method of claim 1, wherein the first resource partition is further determined based at least in part on one or more channel conditions associated with each of the first SIM and the second SIM, a network capability associated with each of the first SIM and the second SIM, or any combinations thereof.

16. The method of claim 1, further comprising:
determining, for the first SIM based at least in part on the first resource partition, the first indication that provides one or more of a first number of supported component carriers (CCs), a first number of supported multiple-input multiple-output (MIMO) layers, a first modulation and coding scheme (MCS) limit, a first throughput limit, or any combinations thereof; and
determining, for the second SIM based at least in part on the first resource partition, the second indication that provides one or more of a second number of supported CCs, a second number of supported MIMO layers, a second MCS limit, a second throughput limit, or any combinations thereof.

17. The method of claim 1, wherein the first indication includes one or more of a channel quality indicator (CQI) or a rank indicator (RI) for the first SIM, and wherein a reported CQI value or RI value is adjusted based at least in part on the first resource partition.

18. The method of claim 1, wherein the transmitting further comprises:
transmitting UE assisted information (UAI) to one or more of the first wireless node or the second wireless node to adapt communications parameters in accordance with the first resource partition.

19. The method of claim 1, wherein one or more connected mode or idle mode measurements of the first SIM are increased or decreased to adapt communications parameters of the first SIM in accordance with the first resource partition, and wherein corresponding measurements of the second SIM are adjusted in accordance with the measurements of the first SIM to achieve the first resource partition.

20. The method of claim 1, further comprising:
selecting, for communications associated with the first SIM, a different serving wireless node based at least in part on the first resource partition; and
transmitting a request to the first wireless node to switch communications associated with the first SIM from the first wireless node to the different serving wireless node.

21. A user equipment (UE) for wireless communication, comprising:
one or more memories storing processor-executable code; and
one or more processors coupled with the one or more memories and individually or collectively operable to execute the code to cause the UE to:
identify a set of available resources for communications at the UE that include one or more baseband resources, one or more radio frequency components, or any combinations thereof, wherein the set of available resources are shared between a first subscriber identification module (SIM) and a second SIM;
determine a first resource partition of the set of available resources that includes a first subset of resources for a first communication using the first SIM and a second subset of resources for a second communication using the second SIM, wherein the first communication and the second communication are at least partially concurrent, and wherein the first resource partition is determined based at least in part on a type of service associated with each SIM, one or more communications parameters associated with each SIM, or any combinations thereof; and
transmit a first indication of supported communication parameters of the first SIM to a first wireless node and a second indication of supported communication parameters of the second SIM to a second wireless node, wherein the first indication is based at least in part on the first subset of resources and the second indication is based at least in part on the second subset of resources, wherein each of the first indication of the supported communication parameters of the first SIM and the second indication of the supported communication parameters of the second SIM comprise one or more of a quantity of supported component carriers, a quantity of supported multiple-input multiple-output layers, a modulation and coding scheme index limit, a modulation scheme limit, or a throughput limit.

22. The UE of claim 21, wherein the one or more processors are individually or collectively further operable to execute the code to cause the UE to:
communicate with the first wireless node using the first SIM and with the second wireless node using the second SIM in accordance with the first resource partition;
determine, subsequent to the communicating, a second resource partition of the set of available resources that includes a third subset of resources for a third communication using the first SIM and fourth subset of resources for a fourth communication using the second SIM, the second resource partition based at least in part on one or more updates to the type of service associated with each SIM, the one or more communications parameters associated with each SIM, or any combinations thereof; and
transmit a third indication of supported communication parameters of the first SIM to the first wireless node and a fourth indication of supported communication parameters of the second SIM to the second wireless node, wherein the third indication is based at least in part on the third subset of resources and the fourth indication is based at least in part on the fourth subset of resources.

23. The UE of claim 21, wherein to determine the first resource partition, the one or more processors are individually or collectively operable to execute the code to cause the UE to:
determine the first resource partition based at least in part on portions of the set of available resources that are compatible with communications of the first SIM and the second SIM, one or more power limits associated with the first SIM and the second SIM, one or more frequency bands used for communications of the first SIM and the second SIM, or any combinations thereof.

24. The UE of claim 21, wherein to determine the first resource partition, the one or more processors are individually or collectively operable to execute the code to cause the UE to:

determine the first resource partition based at least in part on a service priority of a highest priority service of each of the first SIM and the second SIM, an amount of data to be transferred for each of the first SIM and the second SIM, channel conditions associated with each of the first SIM and the second SIM, or any combinations thereof.

25. The UE of claim 21, wherein the first indication is transmitted in a first measurement report to the first wireless node and the second indication is transmitted in a second measurement report to the second wireless node, and wherein each of the first measurement report and the second measurement report provide one or more parameter measurements that generate wireless resource grants for each SIM that are in accordance with the first resource partition.

26. A user equipment (UE) for wireless communication, comprising:

means for identifying a set of available resources for communications at the UE that include one or more baseband resources, one or more radio frequency components, or any combinations thereof, wherein the set of available resources are shared between a first subscriber identification module (SIM) and a second SIM;

means for determining a first resource partition of the set of available resources that includes a first subset of resources for a first communication using the first SIM and a second subset of resources for a second communication using the second SIM, wherein the first communication and the second communication are at least partially concurrent and wherein the first resource partition is determined based at least in part on a type of service associated with each SIM, one or more communications parameters associated with each SIM, or any combinations thereof; and means for transmitting a first indication of supported communication parameters of the first SIM to a first wireless node and a second indication of supported communication parameters of the second SIM to a second wireless node, wherein the first indication is based at least in part on the first subset of resources and the second indication is based at least in part on the second subset of resources, wherein each of the first indication of the supported communication parameters of the first SIM and the second indication of the supported communication parameters of the second SIM comprise one or more of a quantity of supported component carriers, a quantity of supported multiple-input multiple-output layers, a modulation and coding scheme index limit, a modulation scheme limit, or a throughput limit.

27. The UE of claim 26, further comprising:

means for communicating with the first wireless node using the first SIM and with the second wireless node using the second SIM in accordance with the first resource partition;

means for determining, subsequent to the communicating, a second resource partition of the set of available resources that includes a third subset of resources for a third communication using the first SIM and fourth subset of resources for a fourth communication using the second SIM, the second resource partition based at least in part on one or more updates to the type of service associated with each SIM, the one or more communications parameters associated with each SIM, or any combinations thereof; and means for transmitting a third indication of supported communication parameters of the first SIM to the first wireless node and a fourth indication of supported communication parameters of the second SIM to the second wireless node, wherein the third indication is based at least in part on the third subset of resources and the fourth indication is based at least in part on the fourth subset of resources.

28. The UE of claim 26, wherein the means for the determining further comprise:

means for determining the first resource partition based at least in part on portions of the set of available resources that are compatible with communications of the first SIM and the second SIM, one or more power limits associated with the first SIM and the second SIM, one or more frequency bands used for communications of the first SIM and the second SIM, or any combinations thereof.

29. A non-transitory computer-readable medium storing code for wireless communication, the code comprising instructions executable by one or more processors to:

identify a set of available resources for communications at a user equipment (UE) that include one or more baseband resources, one or more radio frequency components, or any combinations thereof, wherein the set of available resources are shared between a first subscriber identification module (SIM) and a second SIM;

determine a first resource partition of the set of available resources that includes a first subset of resources for a first communication using the first SIM and a second subset of resources for a second communication using the second SIM, wherein the first communication and the second communication are at least partially concurrent, and wherein the first resource partition is determined based at least in part on a type of service associated with each SIM, one or more communications parameters associated with each SIM, or any combinations thereof; and transmit a first indication of supported communication parameters of the first SIM to a first wireless node and a second indication of supported communication parameters of the second SIM to a second wireless node, wherein the first indication is based at least in part on the first subset of resources and the second indication is based at least in part on the second subset of resources, wherein each of the first indication of the supported communication parameters of the first SIM and the second indication of the supported communication parameters of the second SIM comprise one or more of a quantity of supported component carriers, a quantity of supported multiple-input multiple-output layers, a modulation and coding scheme index limit, a modulation scheme limit, or a throughput limit.

30. The non-transitory computer-readable medium of claim 29, wherein the instructions are further executable by the one or more processors to:

communicate with the first wireless node using the first SIM and with the second wireless node using the second SIM in accordance with the first resource partition;

determine, subsequent to the communicating, a second resource partition of the set of available resources that includes a third subset of resources for a third communication using the first SIM and fourth subset of resources for a fourth communication using the second SIM, the second resource partition based at least in part on one or more updates to the type of service associated with each SIM, the one or more communications parameters associated with each SIM, or any combinations thereof; and transmit a third indication of supported communication parameters of the first SIM to the first wireless node and a fourth indication of supported communication parameters of the second SIM to the second wireless node, wherein the third indication is based at least in part on the third subset of resources and the fourth indication is based at least in part on the fourth subset of resources.

\* \* \* \* \*